United States Patent
Muscolino

(10) Patent No.: US 11,460,987 B2
(45) Date of Patent: Oct. 4, 2022

(54) MODIFYING GRAPHICAL USER INTERFACE PROCESSING BASED ON INTERPRETATION OF USER INTENT

(71) Applicant: Adobe Inc., San Jose, CA (US)

(72) Inventor: Gregory Muscolino, Novato, CA (US)

(73) Assignee: Adobe Inc., San Jose, CA (US)

( * ) Notice: Subject to any disclaimer, the term of this patent is extended or adjusted under 35 U.S.C. 154(b) by 12 days.

(21) Appl. No.: 16/533,642

(22) Filed: Aug. 6, 2019

(65) Prior Publication Data

US 2021/0042020 A1 Feb. 11, 2021

(51) Int. Cl.
*G06F 3/04845* (2022.01)
*G06F 3/04883* (2022.01)
*G06T 3/20* (2006.01)

(52) U.S. Cl.
CPC ...... *G06F 3/04845* (2013.01); *G06F 3/04883* (2013.01); *G06T 3/20* (2013.01)

(58) Field of Classification Search
CPC .... G06F 3/04845; G06F 3/04883; G06T 3/20
See application file for complete search history.

(56) References Cited

U.S. PATENT DOCUMENTS

| | | | | |
|---|---|---|---|---|
| 5,426,726 A * | 6/1995 | Horiuchi | | G06T 11/203 345/467 |
| 6,288,705 B1 * | 9/2001 | Rosenberg | | G06F 3/016 345/157 |
| 6,466,199 B2 * | 10/2002 | Takase | | G06F 3/038 345/157 |
| 2005/0281467 A1 * | 12/2005 | Stahovich | | G06K 9/00416 382/202 |
| 2006/0007141 A1 * | 1/2006 | Wilson | | G09G 5/08 345/158 |
| 2008/0042974 A1 * | 2/2008 | Sachs | | G06F 3/03548 345/157 |
| 2008/0168364 A1 * | 7/2008 | Miller | | G06F 3/033 715/762 |
| 2008/0180410 A1 * | 7/2008 | McCall | | G06T 11/203 345/179 |
| 2011/0043456 A1 * | 2/2011 | Rubinstein | | G06F 3/04883 345/173 |
| 2012/0284663 A1 * | 11/2012 | Driver | | G06F 9/451 715/784 |

(Continued)

OTHER PUBLICATIONS

Rui Zhao, "Incremental Recognition in Gesture-Based Syntax-Directed Diagram Editors", Apr. 24-29, 1993, Interchi '93, pp. 95-100 (Year: 1993).*

*Primary Examiner* — Nicholas Klicos
(74) *Attorney, Agent, or Firm* — Keller Preece PLLC

(57) ABSTRACT

The present disclosure relates to systems, non-transitory computer-readable media, and methods for modifying output of a graphical user interface based at least on the velocity of user input and an interpretation of user intent. In particular, in one or more embodiments, the disclosed systems can modify the rendering of objects in the graphical user interface based on the velocity of user input to the graphical user interface. Additionally, the disclosed systems can modify the output of the graphical user interface in response to a termination of user input at low velocities by utilizing a rolling buffer to store one or more points of user input before passing the points of user input on to a rendering engine for implementation.

20 Claims, 12 Drawing Sheets

(56) References Cited

U.S. PATENT DOCUMENTS

| | | | |
|---|---|---|---|
| 2015/0049020 A1* | 2/2015 | Yamazaki | G06F 3/0354 345/163 |
| 2016/0253090 A1* | 9/2016 | Angelov | G06F 3/0354 715/863 |
| 2018/0101299 A1* | 4/2018 | Petkov | G06F 3/03545 |

* cited by examiner

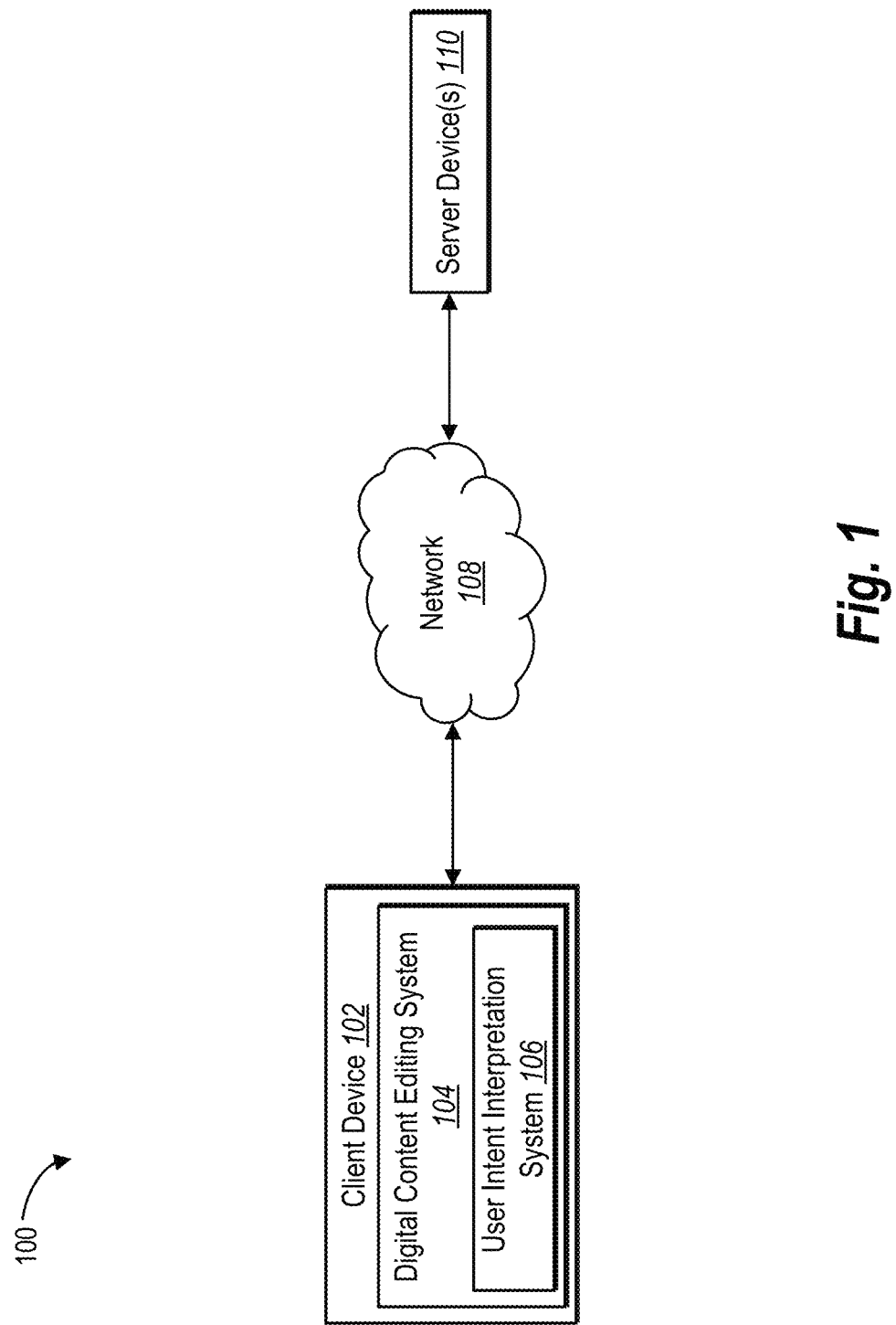

| | Time 1 | Time 2 | Time 3 |
|---|---|---|---|
| Input Appearance | | | |
| User Input Velocity | 25 | 15 | none |
| Lift Off Rolling Buffer | | | |
| Precision Input Velocity Control | Output = 90% x 25=22.5 | Output = 80% x 15=12 | Output = 0 |

*Fig. 7*

MODIFYING GRAPHICAL USER INTERFACE PROCESSING BASED ON INTERPRETATION OF USER INTENT

BACKGROUND

Recent years have seen significant improvements in digital content creation. For example, conventional touch-based systems can allow a user to interact with digital content via touch input. To illustrate, conventional touch-based systems can allow a user to create digital content utilizing touch input on a touch screen.

Although conventional touch-based systems can allow a user to interact with digital content utilizing a touch screen, such systems have a number of problems in relation to accuracy and flexibility of operation. For instance, conventional touch-based systems are typically unable to accurately reflect a user's intent, especially with regard to fine details. Specifically, conventional touch-based systems usually are unable to accurately make fine adjustments to move or create an object based on user input. Conventional touch-based systems are unable to make precise pixel-by-pixel or sub-pixel inputs and are consequently unable to accurately interpret precise user intent. Because conventional touch-based systems cannot generate precise output for fine adjustments, they lack the flexibility and accuracy needed to service a variety of digital content creation tasks requiring precision.

More specifically, typically conventional touch-based systems maintain a direct 1-to-1 correlation between a user's input and manipulation of the on-screen content. Thus, the ability to move or resize an object to a precise position or make other fine adjustments is directly proportional to how precisely the user can move their finger, stylus, or other touch-based input device. Achieving precision on the order of one, or even several, pixels becomes extremely difficult using conventional touch-based systems and represents a significant roadblock in being productive with more complex work on touch screens. These limitations apply not only to manipulations of the artwork on canvas (such as moving or editing vector shapes), but also to common touch interface elements such as sliders.

Further, conventional touch-based systems lack the accuracy to reflect a user's intent with regard to termination of input. Specifically, conventional touch-based systems often interpret input generated as part of lifting a finger or stylus as intent to move a digital object or generate new digital content. That is, when a user is trying to lift their finger (i.e., end the touch gesture), conventional touch-based systems often move the digital content away from the user's desired placement due to slight movement such as rolling of a finger when attempting to end a touch gesture. This inaccuracy requires a user to make further adjustments to the digital content to return to the condition before the prior termination of input. This inaccuracy in interpreting user intent slows down the content creation process and limits the usefulness of conventional touch-based systems in a variety of contexts.

These along with additional problems and issues exist with regard to conventional digital content creation systems.

BRIEF SUMMARY

Embodiments of the present disclosure provide benefits and/or solve one or more of the foregoing or other problems in the art with systems, non-transitory computer-readable media, and methods for interpreting user intent based on the analysis of user input and modifying system output relative to user input in accordance with the interpreted user intent. In particular, the user intent interpretation system can monitor the velocity of user input and can utilize the velocity of user input and other user input signals to infer user intent and modify system outputs (e.g., object manipulation) accordingly. For example, the user intent interpretation system can identify low velocity movement as likely due to an intent of the user to make precise changes. Accordingly, the user intent interpretation system can modify the velocity of movement being modified within the graphical user interface relative to the velocity of user input. In other words, the user intent interpretation system can break the one-to-one correspondence and can scale the velocity of rendering output within the graphical user interface relative to user input. Additionally, the user intent interpretation system can detect low velocity of input followed by a termination of user input as an intent to terminate user input. To avoid undesired movement associated with a lift off event, the user intent interpretation system can maintain a rolling buffer for the user input and can discard user input in the rolling buffer upon detecting termination of user input. In other words, the user intent interpretation system can discard the last few user input points before a termination event and therefore not shift the user's content or selection due to unintentional movement.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 1 illustrates a diagram of an environment in which a user intent interpretation system can operate in accordance with one or more embodiments.

FIG. 7 illustrates a chart of actions for a user intent interpretation system implementing multiple adjustments to the graphical user interface at once in accordance with one or more embodiments.

DETAILED DESCRIPTION

Figure 2A:
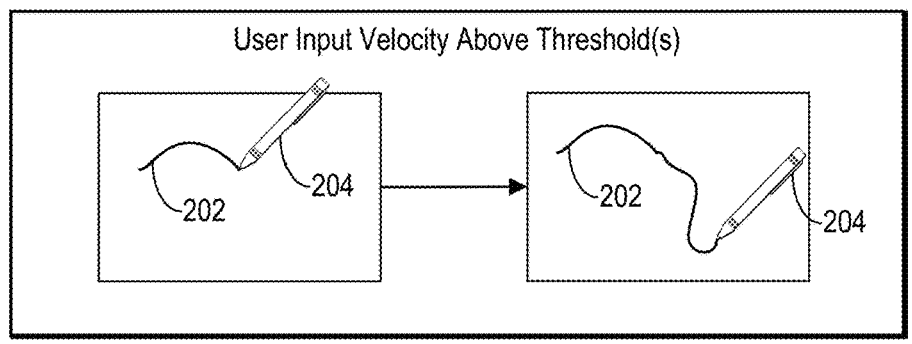
FIGS. 2A-2C illustrate an overview of a process of scaling object movement relative to user input in accordance with one or more embodiments.

This disclosure describes one or more embodiments of a user intent interpretation system that can utilize various aspects of user input to interpret user intent and modify functions of a graphical user interface to better reflect the user's intent and preferences. More specifically, the user intent interpretation system can utilize the velocity of user input to infer intent and adjust the movement and/or creation of objects within the graphical user interface accordingly. For example, in response to detecting low velocity of user input, the user intent interpretation system can infer that a user intends to act with precision. In response to this determination, the user intent interpretation system can adjust the movement of objects on the graphical user interface relative to the velocity of user input. Thus, the user intent interpretation system can preserve the feeling of direct manipulation while offering improved precision with regard to modifications within the graphical user interface reflecting the intent of the user.

To illustrate, the user intent interpretation system can monitor the velocity of user input via a touch screen and can utilize various predetermined thresholds to determine what modifications to make in the response to the user input. For example, based on detecting a low velocity of user input, the user intent interpretation system can modify the rendering of the movement of objects within the graphical user interface relative to the velocity of the user input. More specifically, at low velocities, the user intent interpretation system can recognize that the user intends to make a change or adjustment with precision. When maintaining a direct one-to-one correlation of the user's input and on-screen content, the ability to move an object to a position exactly where a user wants and/or to make very fine adjustments is directly proportional to how precisely the user can move their finger or stylus. The user intent interpretation system can move the object at a reduced velocity relative to the user's input and/or scale down the movement of the object relative to the movement of the user's input so that the user can manipulate the object to move shorter distances more easily than they can physically adjust their input via a touch screen.

Upon detecting an increase in the velocity of the user input, the user intent interpretation system can phase out the rate change of movement of the object on screen relative to the velocity of the user input gradually. To ensure a smooth transition between modified movement of the graphical user interface object and a one-to-one ratio between user input and object movement, the user intent interpretation system can gradually, in each frame of movement of the graphical user interface, reduce the modification until the movement of the graphical user interface object returns to a one-to-one correlation.

Additionally, in response to detecting low velocity of user input, the user intent interpretation system can implement a rolling buffer. The rolling buffer is a data structure that can store points of user input cyclically. That is, the rolling buffer receives recent points of user input and passes on the points of user input in the order received. The rolling buffer can store a number of points of user input based on the velocity of user input. Thus, the rolling buffer can store points of user input briefly before passing them to a rendering engine for rendering via a graphical user interface. Accordingly, the rolling buffer allows the user intent interpretation system to take action with respect to the stored points of user input. Further, the rolling buffer enables the user intent interpretation system to take this action without appreciable delay or lag.

For example, the provider incentive communication system can discard the points of user input in response to determining that the user intended to terminate user input before the stored points of user input were received. To illustrate, in response to detecting a termination of user input, the user intent interpretation system can infer that the user intended to terminate user input upon the beginning of a gesture lifting off the user input. Thus, in response to receiving a termination of user input, the user intent interpretation system can discard the contents of the rolling buffer and instead pass the termination of user input on for implementation. By determining not to implement the contents of the rolling buffer, the user intent interpretation system can avoid implementation of points of input that the user did not intend to implement, such as wobbling while lifting a finger or stylus from a touch screen.

Additionally, the user intent interpretation system can dynamically modify the size of the rolling buffer based on the velocity of the user input. That is, the user intent interpretation system can determine a buffer size for the rolling buffer based on the velocity of user input and can update the size of the rolling buffer without interruption to the graphical user interface output or the rolling buffer itself. In one or more embodiments, the user intent interpretation system stores more points of user input in the rolling buffer when the velocity of user input is low and fewer points of user input in the rolling buffer when the velocity of user input is high. Thus, the user intent interpretation system can avoid the appearance of lag in implementation of user input. Further, by dynamically modifying the size of the rolling buffer, the user intent interpretation system can phase the rolling buffer in and out gradually based on the velocity of user input and one or more predetermined thresholds.

The user intent interpretation system provides many advantages and benefits over conventional touch-based systems and methods. For example, by monitoring and utilizing the velocity of user input to interpret a user's intent with regard to precision, the user intent interpretation system improves accuracy relative to conventional touch-based systems. Specifically, by modifying the rendering of objects within the graphical user interface based on the velocity of user input, the user intent interpretation system can provide greater accuracy in implementing edits to the graphical user interface that reflect the user's intention. The user intent interpretation system can modify the movement of objects in the graphical user interface relative to the velocity or scale of user input. Accordingly, the system can provide greater precision in output than the precision with which the user provides input.

Further, the user intent interpretation system is useful in a wide variety of circumstances that prior systems failed to adequately address, and accordingly offers increased flexibility. For example, the user intent interpretation system can provide accurate output relative to the user's intent even when the desired output requires extreme precision, including on the magnitude of single pixel increments. Further, the user intent interpretation system facilitates the ease and efficiency of complex work on touch screens by enabling users to "get it right" quickly and without the need to repeat actions to achieve the desired outcome. Accordingly, the user intent interpretation system provides increased efficiency and productivity in circumstances where prior systems failed.

Additionally, by utilizing a rolling buffer based on the velocity of user input before implementing points of user input, the user intent interpretation system offers increased accuracy when receiving a termination of user input. Specifically, the user intent interpretation system solves the problem of undesired adjustment of the graphical user interface as part of a "lift off" motion by discarding any points of user input in the rolling buffer upon receiving a termination of input. To illustrate, the user intent interpretation system does not implement points of user input from a small movement detected as the user removes his or her finger from a touch screen. Instead, the user intent interpretation system, upon detecting the termination of user input and in response to this termination of user input, determines not to implement those points of user input. The rolling buffer allows the user intent interpretation system to make this determination notwithstanding the fact that the touch screen receives those points of user input before receiving the termination of user input. That is, utilizing the rolling buffer allows the user intent interpretation system to make determinations about points of user input based on points of user input received later in time. Accordingly, the user intent interpretation system provides increased accuracy relative to the user's intent.

Further, by dynamically modifying the size of the rolling buffer based on the velocity of user input, the user intent interpretation system provides a more accurate termination output while maintaining a smooth user experience. As discussed, the user intent interpretation system can determine the velocity of user input. Then, the user intent interpretation system can determine a size (i.e. a number of points of user input) for the rolling buffer based on that velocity. That is, the user intent interpretation system can store more points of user input in the rolling buffer before implementation at lower velocities, and fewer points at higher velocities. By dynamically modifying the size of the rolling buffer, the user intent interpretation system operates smoothly. Accordingly, the user intent interpretation system can avoid any appearance of lag and can ensure accuracy at all velocities.

As illustrated by the foregoing discussion, the present disclosure utilizes a variety of terms to describe features and advantages of the user intent interpretation system. Additional detail is now provided regarding the meaning of such terms. To illustrate, as used herein, the term "user input" refers to an action from a user detectable by a computing device. In particular, the term "user input" can include touch input to a touch screen via an input implement such as a stylus or a finger. For example, user input can include a touch of a touch screen, scrolling of a mouse, gestures on a track pad, a touch on a touch screen drawing a line and/or figure, or a touch on a touch screen manipulating an option within a graphical user interface. Additionally, as used herein, the term "point of user input" refers to a unit of user input received at a specific time. For example, a movement of a finger across a touch screen can start with an initial point, have intermediate points, and finish with a termination point. Points of user input can be measured relative to the touch device that is receiving the user input. For example, a point of user input can be measured in pixels or an abstract unit of measurement such as an IOS point ($1/163$ of an inch). As such, in one or more embodiments, if a user input includes moving an input device one inch across a touch device, the user input can comprise 163 points of user input when using $1/163$ of an inch as the unit of measurement of points of user input.

Further, as used herein, the term "termination of user input" refers to an action that ends user input, such that a computing device is no longer receiving user input as a result of the termination. To illustrate, as used herein, the term "termination of user input" refers to an input gesture that lifts or otherwise ends user input, such as a finger or a stylus lifting off of a touch screen. For example, termination of user input can include a user lifting a finger off of a track pad, a user removing a stylus from a touch screen, or a user moving a hand off of a mouse. In still further implementations, termination of user input can include pulling an input device away from a touch device without lifting the user input device off of the touch device. For example, in implementations where the touch device can detect hovering over the touch device as user input, termination of the user input can comprise increasing the distance of the input device from the touch device so the input device is no longer detectable by the touch device.

Also, as used herein, the term "velocity of user input" refers to the speed of user input. For example, velocity of user input can refer to the speed of a user input device (e.g., a user's finger, stylus, mouse, etc.) as the user input device is moved across the touch screen or touch device. In particular, the term "velocity of user input" can include the speed of user input measured in points per second. The velocity of user input can refer to a variety of speeds with which the user inputs various movements, signals, and/or gestures. For example, the velocity of user input can be 0 points per second, 15 points per second, or 25 points per second.

Additionally, as used herein, the term "user interface element" refers to an interactable portion of a graphical user interface. In particular, the term "user interface element" can include a sliding element, a color wheel or palette, a drop-down menu, a text box, a digital object, an input box, a digital canvas, or other portions of a graphical user interface capable of receiving interaction.

Further, as used herein, the term "touch device" refers to a portion of a computing device capable of receiving touch input. In particular, the term "touch device" can include a device that allows a user to interact with a computing device through touching areas on the device or hovering over the touch device. To illustrate, a touch device can include portions of a monitor, a mobile device, a tablet, a trackpad, a mouse, a touchscreen, or other computing devices capable of receiving touch input. Furthermore, a touch device, as used herein, can utilize optical, capacitive, resistive, or other touch screen technologies.

Also, as used herein, the term "rendering" refers to representing or depicting one or more objects. In particular, the term "rendering" can include including a digital object within a graphical user interface. To illustrate, rendering can include utilizing a rendering engine to visualize the movement, change, and overall appearance of a digital object within a graphical user interface. Further, rendering can refer to representing or depicting digital objects based on user input.

Additionally, as used herein, the term "default state" refers to a preselected option adopted by a system in the absence of modification or specification of an alternative. In particular, the term "default state" can include maintaining a direct, one-to-one correlation between the velocity of user input and the velocity of graphical user interface output. For example, a default state can include rendering movement without regard to the velocity of user input, without assigning meaning to particular gestures of user input, or without implementing any modifications to the system output relative to the user input.

Further, as used herein, the term "scaling" refers to modifying the relative size or extent of something. In particular, the term "scaling" can include modifying the rendering of a movement of an object within a graphical user interface relative to corresponding received input. To illustrate, scaling can include modifying the distance and/or velocity of movement within a graphical user interface relative to the velocity and/or distance of user input. For example, scaling can include rendering the system output of received movement of a graphical user interface element as a smaller distance than the distance of the received movement. Scaling can also include rendering the system output of a received user input drawing a line in a graphical user interface as a smaller distance than the distance of the received user input.

Also, as used herein, the term "rolling buffer" refers to a data structure that utilizes a dynamically sized buffer to move user input through before implementation within a graphical user interface. In particular, the term "rolling buffer" can include a data structure through which a system passes points of user input prior to implementation or use. That is, the rolling buffer can briefly store the points of user input before a system passes those points of user input, in the order received, on to a rendering engine for rendering.

Additional detail will now be provided regarding the user intent interpretation system in relation to illustrative figures portraying exemplary embodiments. In particular, FIG. 1 illustrates an environment 100 for implementing a user intent interpretation system in accordance with one or more embodiments. As illustrated in FIG. 1, the environment 100 includes a client device 102, including a digital content editing system 104, which in turn includes the user intent interpretation system 106. The client device 102 communicates, via the network 108, with the server device(s) 110.

The client device 102 is a device associated with a user of the user intent interpretation system 106. As mentioned, the client device 102 can include a digital content editing system 104 and a user intent interpretation system 106. The user can utilize the client device 102 to interface with the digital content editing system 104 and the user intent interpretation system 106. Accordingly, the client device 102 can provide the digital content editing system 104 with user input to manipulate one or more graphical user interface objects.

The client device 102 can include various types of computing devices. For example, the client device 102 can be a mobile device (e.g., a smart phone), tablet, laptop computer, desktop computer, or another type of computing device as further explained below with reference to FIG. 12. Additionally, the client device 102 can include different versions of the digital content editing system 104 and/or the user intent interpretation system based on the type of client device 102.

In one or more embodiments, the digital content editing system 104 is an application on the client device 102. The digital content editing system 104 can facilitate editing, creation, and other management of digital content. That is, the digital content editing system 104 can receive user input via the client device 102. Then, the digital content editing system 104 can implement changes to the digital content based on the received user input. The digital content editing system 104 can edit and/or create various types of media, such as digital pictures, videos, drawings, slides, etc.

Although FIG. 1 illustrates the digital content editing system 104 implemented via the client device 102, the user digital content editing system 104 can be implemented via other components. For example, the user intent interpretation system 106 can be implemented, in whole or in part, by the server device(s) 110. While FIG. 1 shows a single client device 102, it will be appreciated that the environment 100 can include hundreds, thousands, millions, or billions of user devices 102.

Additionally, the digital content editing system 104 can include a variety of software or hardware implementations on the client device 102. For example, the user intent interpretation system 106 can be an online application (e.g., a web browser), and a user at the client device 102 can enter a Uniform Resource Locator (URL) or other address directing the web browser to interact with the server device(s) 110. Alternatively, the digital content editing system 104 can be a native application developed for use on the client device 102. Additionally, the server device(s) 110 can include one or more computing devices including those explained below with reference to FIG. 12.

Additionally, the digital content editing system 104 can include the user intent interpretation system 106. The user intent interpretation system, as discussed in greater detail below, can interpret user intent based on one or more characteristics of the user input. Then, the user intent interpretation system 106 can determine system output based on the interpreted user intent. In one or more embodiments, the user intent interpretation system 106 receives user input via the client device 102 and the digital content editing system 104. Further, in one or more embodiments, the user intent interpretation system 106 can monitor the velocity in user input via the digital content editing system 104.

In one or more embodiments, the server device(s) 110 are web server(s) communicatively coupled with the client device 102 via the network 108. However, in one or more embodiments, the server device(s) 110 communicate directly with the client device 102 and thereby bypass the network 108. In one or more embodiments, the server device(s) make various determinations regarding the content within the digital content editing system 104, and even with regard to the user intent interpretation system 106. For example, the web server(s) 110 can monitor user input received via the client device 102, including the velocity of user input. The web server(s) 110 can then make determinations for system output based on that velocity of user input. However, in one or more other embodiments, these functions can be performed by the user intent interpretation system 106 itself.

The client device 102, the server device(s) 110, and the network 108 may communicate using any communication platforms and technologies suitable for transporting data and/or communication signals. The network 100 can utilize any known communication technologies, devices, media, and protocols supportive of data communications, examples of which are described with reference to FIG. 12. In one or more embodiments, the digital content editing system 104 can receive content for editing and/or management via the network 108. Further, the digital content editing system can upload content via the network 108.

Figure 2B:
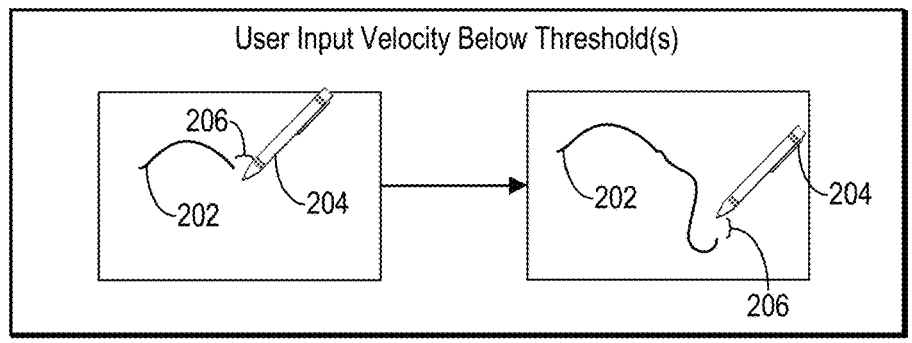
Figure 2C:
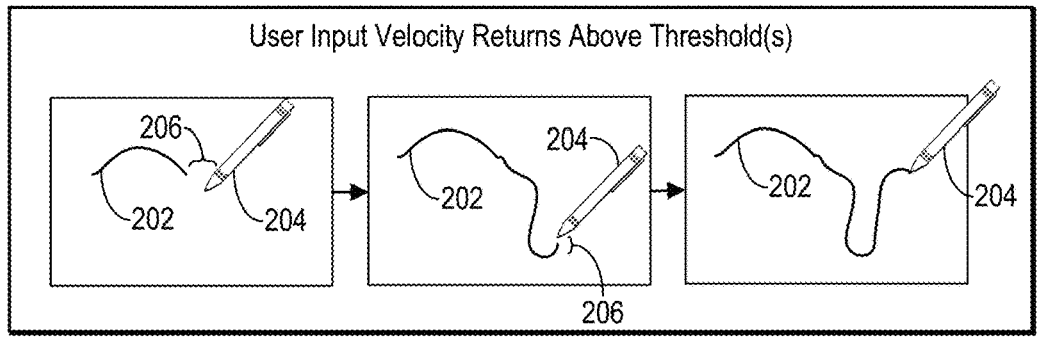

As discussed above, the user intent interpretation system 106 can modify the movement of objects within the graphical user interface based on the velocity of user input. For instance, FIGS. 2A-2C illustrate the output of the user intent interpretation system 106 in a variety of circumstances in accordance with one or more embodiments. However, for ease of illustration, FIGS. 2B-2C exaggerate some functions of the user intent interpretation system 106. Specifically, FIGS. 2A-2C show the output of a graphical user interface relative to the movement of a user input implement producing user input in accordance with one or more embodiments of the user intent interpretation system 106.

FIG. 2A shows the output of the user intent interpretation system 106 relative to the user input of a stylus when the velocity of user input is above one or more predetermined thresholds. More specifically, FIG. 2A shows system output 202. While FIG. 2A illustrates the system output 202 as a curved line drawn freely, the system output 202 can be a variety of output types, such as the motion of an object across the graphical user interface, re-sizing of an object in the graphical user interface, movement of a graphical user interface element and/or setting, etc.

Additionally, FIG. 2A includes the user input implement 204. More specifically, FIGS. 2A-2C illustrate the user input implement 204 as a touch stylus on a touch screen. However, the user input implement 204 can be any of a variety of implements, such as a finger, other part of a user's body, or any of various types of touch screen pens.

As mentioned, FIG. 2A illustrates a graphical user interface where the user intent interpretation system 106 determines that the velocity of user input is above any predetermined threshold(s). In the first panel of FIG. 2A, the system output 202 tracks exactly with the user input implement 204. That is, the user input implement 204 "draws" a line on the touch screen. Then, in response, the user intent interpretation system 106 renders the system output 202 at a one-to-one ratio with the velocity drawn by the user input implement 204. Additionally, the user intent interpretation system 106 renders the system output 202 with no delay. Consequently, no output gap occurs between the system output 202 and the user input implement 204.

Then, in the second panel of FIG. 2A, the user input implement 204 continues to draw a line on the touch screen at a velocity above a predetermined threshold. Because the velocity of user input remains above any predetermined threshold(s), the user intent interpretation system 106 continues to cause the system output 202 to process and render at a one-to-one ratio with the user input implement 204. Further, as discussed with regard to the first panel, the user intent interpretation system 106 does not introduce any gap between the system output 202 and the user input implement 204.

Thus, as illustrated by FIG. 2A, in one or more embodiments, the user intent interpretation system 106 determines that the velocity of user input is above one or more predetermined threshold(s). Then, in response to that determination, the user intent interpretation system 106 renders the output of the graphical user interface at a direct one-to-one correlation. To illustrate, the user intent interpretation system 106 renders the velocity of the system output 202 at a direct one-to-one correlation with the velocity of received user input. That is, the user intent interpretation system 106 renders the velocity of the movement and creation of objects in the graphical user interface at a velocity equal to the velocity of user input. Further, the user intent interpretation system 106 the actual movement and/or creation of objects within the graphical user interface to track the same distance as the distance travelled by the user input. Accordingly, as illustrated by FIG. 2A, the user intent interpretation system 106 ensures that the graphical user interface output tracks proportionally and in real time with the input implement 204.

FIG. 2B illustrates output of the user intent interpretation system 106 when the velocity of user input is below one or more predetermined threshold(s). More specifically, FIG. 2B illustrates system output 202, user input implement 204, and an output gap 206a. The user intent interpretation system 106 creates an output lag 206a based on a difference in velocity between the movement of the user input implement 204 and the size of the system output 202. That is, the user intent interpretation system 106 creates the output lag 206a as a result of modifying the system output 202 velocity relative to the user input implement 204 velocity. As mentioned, FIGS. 2B-2C exaggerate the size of the output gap 206a for purposes of explanation.

By creating an output lag (and resultant output gap), the user intent interpretation system 106 allows the user to maneuver at greater precision and for smaller increments than he or she can physically move the input implement. For example, a user may intend to draw a line with a very precise length and shape. As a result, the user is likely to move the user input implement 204 at a very low velocity. Then, the user intent interpretation system 106 can determine that the velocity of user input is below at least one predetermined threshold. Based on that determination, the user intent interpretation system 106 can cause the system output 202 to render at a lower velocity than the velocity of user input. Further, the user intent interpretation system 106 can cause the system to render movement of the system output 202 to cover a smaller distance than the user input. Thus, the speed and distance of the system output 202 are lower than the speed and distance of the user input. Accordingly, the user intent interpretation system 106 enables the user to utilize more precise system output 202 than the precision with which he or she can physically move the user input implement 204.

The first panel of FIG. 2B, shows the user intent interpretation system 106 modifying the system output 202 relative to the velocity of the user input implement 204. The user intent interpretation system 106 modifies the velocity of the system output 202 in response to determining that the velocity of user input is below one or more predetermined thresholds. Accordingly, the first panel of FIG. 2B shows the output gap 206a between the user input implement 204 and the system output 202. In various embodiments, the user intent interpretation system 106 can implement a variety of changes to velocity in response to various predetermined thresholds. Accordingly, though FIG. 2B shows a particular size of the output gap 206a, the user intent interpretation system 106 can cause various sizes of output gap 206a to occur.

For example, upon detecting a user input below a first threshold (e.g., 30 points per second), the user intent interpretation system 106 can infer that the user intends to utilize increased precision. Then, the user intent interpretation system 106 can render the system output 202 at a first scale (e.g., 90%) of the velocity of the user input. That is, in one or more embodiments, the user intent interpretation system 106 causes the system output 202 to move at 90% of the velocity of the user input and 90% of the distance moved by the user input. Thus, the user intent interpretation system 106 will cause an output gap for the remaining 30% of the movement of the user input implement 204. Upon detecting a user input below a second threshold (e.g., 20 points per second), the user intent interpretation system 106 can infer that the user intends to utilize still further increased precision. Then, the user intent interpretation system 106 can render the system output 202 at a second scale (e.g., 80%) of the velocity of the user input. Still further, upon detecting a user input below a third threshold (e.g., 10 points per second), the user intent interpretation system 106 can infer that the user intends to utilize still further precision. Then, the user intent interpretation system 106 can render the system output 202 at a third scale (e.g., 70%) of the velocity of the user input.

The user intent interpretation system 106 can dynamically detect the velocity of the user input and dynamically modify the scale at which the system output 202 is rendered based on which threshold the velocity of the user input meets. To this end, as shown in the second panel of FIG. 2B, the user intent interpretation system 106 can determine that the velocity of user input is below an additional predetermined threshold relative to the first panel of FIG. 2B (e.g., that the user has further reduced the velocity of the user input). In response, the user intent interpretation system 106 can implement a further degree of modification to the rendering of the system output 202. In particular, as shown in the second panel of FIG. 2B, the user intent interpretation system 106 determines that the velocity of user input has slowed such that the velocity of user input is below at least one additional predetermined threshold. Accordingly, as shown in the second panel of FIG. 2B, the user intent interpretation system 106 further decreases the velocity of the system output 202 relative to the velocity of the movement of the user input implement 204, which increases the output gap 206b between the user input implement 204 and the system output 202.

As mentioned briefly above, FIG. 2B shows an exaggerated illustration of the output of the user intent interpretation system 106 relative to the user input when the velocity of user input is below one or more predetermined thresholds. At sufficiently low velocities of user input, the user intent interpretation system 106 can modify the velocity of system output 202 relative to the velocity of user input. However, in one or more embodiments, the modification of graphical user interface output at these low velocities is a positive reflection of user intent and does not "lag" behind user input to the extent illustrated in FIG. 2B. Accordingly, FIGS. 2B-2C illustrate an exaggerated modification of user input for ease of explanation.

Modifications of the scale of system output 202 relative to user input are generally undesirable at higher velocities of user input. That is, when a user increases velocity, the user intent interpretation system 106 can infer that the user no longer requires increased precision implemented at low velocities. Based on this determination, the user intent interpretation system 106 can gradually "phase out" modifications based on determining that the user input moves above the various predetermined thresholds. That is, as the velocity of user input increases above each predetermined threshold, the user intent interpretation system 106 can diminish any modifications to system output 202 accordingly.

As illustrated in FIG. 2C, upon detecting an increase of the velocity of user input above the one or more predetermined thresholds, the user intent interpretation system 106 can gradually return the graphical user interface output to a direct one-to-one correlation with user input. FIG. 2C also illustrates the system output 202, user input implement 204, and output gaps 206a, 206b. More specifically, FIG. 2C shows a series of changes implemented by the user intent interpretation system 106 in response to determining that the system output 202 is moving above each of a set of predetermined thresholds.

The first panel of FIG. 2C illustrates the graphical user interface at a time when the velocity of user input below one or more predetermined thresholds. Accordingly, the user intent interpretation system 106 renders the velocity of the system output 202 at a scaled rate comparted to the velocity of the user input. Thus, the system output 202 lags behind the user input implement 204. Further, user intent interpretation system 106 causes the output gap 206b to appear due to the diminished scale of the system output 202 relative to the scale of user input.

The second panel of FIG. 2C illustrates the user intent interpretation system 106 determining that the velocity of user input remains below at least one predetermined threshold but is above at least one more predetermined threshold than in the first panel of FIG. 2C. Thus, the user intent interpretation system 106 diminishes the modifications to the velocity of the system output 202 relative to the velocity of user input. However, based on the determination that the velocity of user input is still below at least one predetermined threshold, the user intent interpretation system 106 can continue to implement some degree of modification to the velocity of the system output 202 relative to the velocity of user input. Accordingly, the user intent interpretation system 106 renders the system output 202 such that the output gap 206a remains but is diminished relative to the output gap 206b as shown in the first panel of FIG. 2C.

Because the user intent interpretation system 106 can utilize various predetermined thresholds to modify the output of the graphical user interface differently at different user input velocities, the user intent interpretation system 106 can return the movement of the graphical user interface to a default state smoothly and gradually. For example, the user intent interpretation system 106 can scale the modification gradually from 70% of the velocity and scale of user input to a direct one-to-one correlation gradually and sequentially diminishing the modification in 10% steps. Thus, rather than abruptly modifying back to a default state, the user intent interpretation system 106 provides a smooth transition. In other words, even if the user input velocity jumps up in speed instantly, the user intent interpretation system 106 can gradually return to the one-to-one correlation (e.g., at 10% per frame) to avoid the appearance of the system output 202 jumping.

The third panel of FIG. 2C illustrates the graphical user interface at a time at which the user intent interpretation system 106 determines that the velocity of user input is above all relevant predetermined thresholds. More specifically, FIG. 2C shows the system output 202 rendered at a one-to-one correlation with received user input. Accordingly, the user intent interpretation system 106 causes the system output 202 to track with the user input implement 204 at a one-to-one ratio. Thus, the third panel of FIG. 2C does not include an output gap. The user intent interpretation system 106 phases out modifications to the scale of the system output 202 relative to user input smoothly and without interruption to the user.

Figure 3:
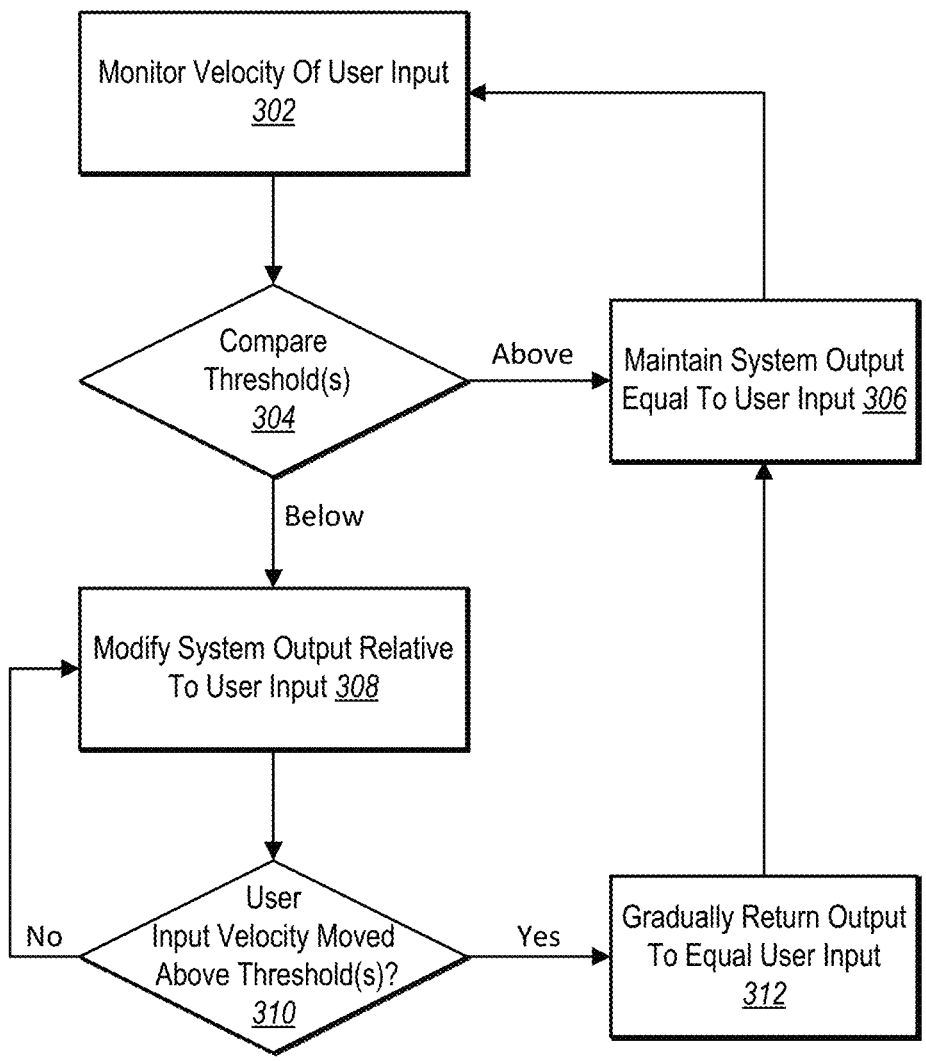
FIG. 3 illustrates a state diagram for modifying the movement of objects within the graphical user interface relative to user input in accordance with one or more embodiments.

FIG. 3 illustrates additional detail for the process of modifying graphical user interface output relative to the velocity of user input. More specifically, FIG. 3 illustrates acts for dynamically modifying the output of a graphical user interface relative to user input in accordance with one or more embodiments. For example, the user intent interpretation system 106 can perform act 302 of monitoring the velocity of user input. That is, the user intent interpretation system 106 can continuously monitor the velocity of user input into the graphical user interface via a touch device. The user intent interpretation system 106 can monitor a variety of types of user input, such as movement of a stylus on a touch screen or movement of a finger on a track pad. Further, the user intent interpretation system 106 can monitor the velocity of user input in a variety of contexts, including user interaction with digital objects in the graphical user interface and/or user interaction with selectable graphical user interface elements. In one or more embodiments, the user intent interpretation system 106 can monitor the velocity of user input via the digital content editing system 104 and the client device 102. The user intent interpretation system 106 can monitor the velocity of user input in points per second.

Then, the user intent interpretation system 106 can perform act 304 of comparing predetermined threshold(s) to the velocity of user input. As discussed briefly above, the user intent interpretation system 106 can utilize a set of predetermined thresholds to determine what action to take with regard to the user's intent. That is, in one or more embodiments, the user intent interpretation system 106 can determine that a user intends to utilize additional precision and can implement different modifications to system output 202 relative to user input based on the velocity of user input. The predetermined thresholds can include any of a variety of speeds in a variety of unit types and can correspond to a variety of changes to system output 202 relative to user input. For example, in one or more embodiments, the user intent interpretation system 106 can include a predetermined threshold at 30 points per second, 20 points per second, and/or 10 points per second.

In one or more embodiments, the user intent interpretation system 106 receives predetermined thresholds from an administrator, either via the client device 102 or the server device(s) 110. In one or more other embodiments, the user intent interpretation system 106 can receive predetermined thresholds from the user via the client device. Further, the user intent interpretation system 106 can include default predetermined thresholds and can allow modification from the server device(s) 110 and/or the client device 102.

If the user intent interpretation system 106 determines that the velocity of user input is above each of the predetermined threshold(s), then the user intent interpretation system 106 can proceed to act 306 of maintaining system output velocity equal to velocity of user input. That is, the user intent interpretation system 106 can maintain the graphical user interface at the default state of a direct one-to-one correlation between the scale and velocity of user input and the scale and velocity of graphical user interface output. As shown in FIG. 3, the user intent interpretation system 106 can continue to dynamically monitor the velocity of user output and proceed again to act 302.

However, if the user intent interpretation system 106 determines that the velocity of user input is at or below at least one of the predetermined threshold(s), then the user intent interpretation system 106 can proceed to act 308 of modifying system output relative to user input. That is, the user intent interpretation system 106 can infer from the low velocity of user input that the user requires additional precision. Further, the user intent interpretation system 106 can modify the scale and velocity of the graphical user interface output relative to the user input. The user intent interpretation system 106 can determine the appropriate modification based on the velocity of the user input and applicable predetermined threshold(s).

The user intent interpretation system 106 can modify the scale of various aspects of system output 202 relative to user input. The user intent interpretation system 106 can modify the velocity of system output 202 relative to the velocity of user input. Additionally, the user intent interpretation system 106 can modify the distance moved or tracked by the system output 202 relative to the distanced moved by the user input.

For example, in one or more embodiments, the user intent interpretation system 106 can provide movement at a "default" state of direct one-to-one correlation if the velocity of user input is at or above 40 points per second. In this example embodiment, the user intent interpretation system 106 can modify the velocity and scale of graphical user interface output to 90% of the velocity of user input when the velocity of user input is between 21 and 30 points per second (e.g., a first predetermined threshold), 80% of the velocity of user input when the velocity of user input is between 11 and 20 points per second (e.g., a second predetermined threshold), and 70% of user input when the velocity of user input is at or below 10 points per second (e.g., a third predetermined threshold).

Additionally, the user intent interpretation system 106 can implement a minimum velocity of system output 202 relative to user input. The minimum velocity of system output 202 can represent the largest disparity between the scale and velocity of graphical user interface output and user input that the user intent interpretation system 106 will implement. In one or more embodiments, this minimum velocity of system output 202 relative to user input corresponds to the lowest predetermined threshold. That is, the user intent interpretation system 106 can implement a minimum velocity of system output relative to user input by associating that minimum value with the lowest predetermined threshold.

In one or more embodiments, there will be a velocity of system output 202 relative to user input that may be perceived as "lag" or another negative reflection of the user's intent, even at very slow user input velocities. The user intent interpretation system 106 can avoid any appearance of lag by implementing a minimum velocity of system output 202 relative to velocity of user input. As discussed above, the predetermined thresholds and their associated modifications can be received in a variety of ways. As such, in one or more embodiments, a default minimum velocity of system output 202 relative to user input may be modified by the server device(s) 110 and/or the client device.

Upon implementing modifications relative to user input, the user intent interpretation system 106 can proceed to act 310 of determining whether the user input velocity has moved above the threshold(s). If the user intent interpretation system 106 determines that the velocity of user input has not moved above the predetermined threshold, the user intent interpretation system 106 can continue to act 308. That is, the user intent interpretation system 106 can continue to maintain the modified system output relative to user input. More specifically the user intent interpretation system 106 can continue to implement changes to the scale of system output 202 relative to user input.

In one or more embodiments, as discussed with regard to FIGS. 2B-2C, act 310 can include determining that the velocity of user input remains below at least one predetermined threshold but falls between different predetermined thresholds than prior velocity of user input. In response to this determination, the user intent interpretation system 106 can modify the system output 202 relative to user input based on predetermined threshold(s) and their associated modifications. The user intent interpretation system 106 can dynamically modify the scale of the system output 202 relative to user input by continuously monitoring the velocity of user input. Thus, the user intent interpretation system 106 can maintain a smooth and intuitive user experience despite potentially frequent changes to system output 202 velocity.

However, if the user intent interpretation system 106 determines that the velocity of user input has moved above the threshold(s), then the user intent interpretation system 106 can proceed to act 312 of gradually returning the output to equal user input. As discussed above with regard to FIG. 2C, the user intent interpretation system 106 can gradually return the scale and velocity of system output to return to the default state of direct one-to-one correlation with the scale and velocity of user input. Then, upon returning to the default state, the user intent interpretation system 106 can proceed again to act 306 and maintain that default state.

Figure 4:
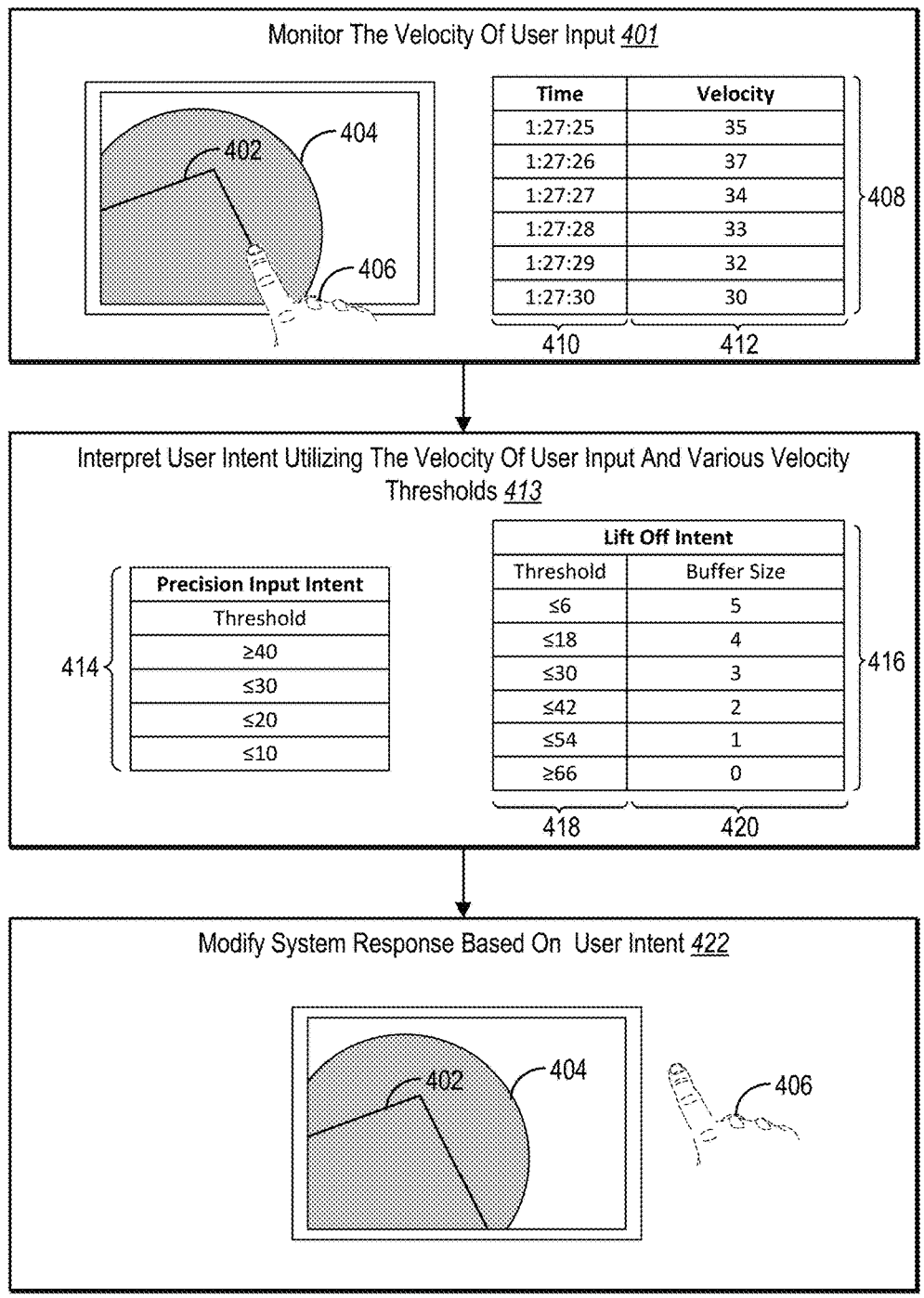
FIG. 4 illustrates an overview of a process for modifying graphical user interface output based on interpretation of user intent to terminate user input in accordance with one or more embodiments.

As discussed above, the user intent interpretation system 106 can also modify system output with regard to the termination of input by modifying graphical user interface output for a received lift off gesture or other termination event. FIG. 4 illustrates an overview of this process, which can operate in tandem with the modification of system output 202 relative to user input described above. That is, the user intent interpretation system 106 can determine multiple interpretations of user intent at once. Further, the user intent interpretation system 106 can implement multiple modifications to system output 202 based on those multiple interpretations.

For example, the user intent interpretation system 106 can perform act 401 of monitoring the velocity of user input. As discussed above, the user intent interpretation system 106 can continuously monitor the velocity of user input over time. The user intent interpretation system 106 can monitor the velocity of various types of user input performing various actions. For example, the user intent interpretation system 106 can monitor the velocity of user input that moves objects through the graphical user interface, that reshapes objects within the graphical user interface, or that moves selectable options within the graphical user interface.

As shown in FIG. 4, the user intent interpretation system 106 can monitor the velocity of user input modifying digital objects, such as the modified digital object 402 and the unmodified digital object 404. FIG. 4 illustrates this modification as a result of motion of the user hand 406. More specifically, within act 401, FIG. 4 illustrates the resizing of the modified digital object 402 via the motion of the user hand 406.

The user intent interpretation system 106 can track the velocity of user input throughout a variety of times. The velocity chart 408 visualizes an example tracking over a short period of time. More specifically, the time column 410 includes various times at which the user intent interpretation system 106 tracks the velocity of user input. The velocity column 412 includes the corresponding recorded user input velocities in points per second. The user intent interpretation system 106 can utilize these velocities to determine whether and how to modify system output relative to user input.

Thus, the user intent interpretation system 106 can perform act 413 of interpreting user intent utilizing the velocity of user input and various predetermined thresholds. Similar to the utilization of predetermined thresholds above with regard to modification of the scale of system output 202 relative to the scale of user input, the user intent interpretation system 106 can utilize predetermined thresholds to determine whether to implement a rolling buffer for user input. In act 413, FIG. 4 includes visualizations of a set of thresholds for two interpretations of intent.

The precision input intent chart 414 includes a set of predetermined thresholds for modification of the scale of system output 202 relative to user input. In one or more embodiments, the user intent interpretation system 106 can associate the predetermined thresholds with various modifications to the scale of system output 202 relative to user input. For example, the user intent interpretation system 106 can render the scale of system output 202 at a default state when the velocity of user input is at or above 40 points per second.

In this example, the user intent interpretation system 106 can render the scale of system output 202 at 95% of the user input when the user input is between 30 and 39, at 90% of the user input when the user input is between 20 and 29, and so on. However, as discussed above, the user intent interpretation system 106 can implement a variety of predetermined thresholds, and they need not be the set of predetermined thresholds included in FIG. 4. For example, the user intent interpretation system 106 can include and implement predetermined thresholds at user input velocities of 45 points per second, 10 pixels per second, or any velocity of user input in any of a variety of measurements of velocity.

As discussed briefly above, the user intent interpretation system 106 can implement a rolling buffer based on the velocity of user input. Further, the user intent interpretation system 106 can dynamically modify the size of the rolling buffer based on the velocity of user input. The lift off intent chart 416 provides an example embodiment of predetermined thresholds for the velocity of user input. Further, the lift off intent chart 416 includes corresponding sizes for the rolling buffer. The lift off intent chart 416 includes a predetermined threshold column 418 and a buffer size column 420. The predetermined threshold column 418 includes a set of predetermined thresholds for velocity of user input in points per second. The buffer size column 420 includes a buffer size in points of user input corresponding to each predetermined threshold. However, similarly to the set of predetermined thresholds included in the precision input intent chart 414, the lift off intent chart 416 does not include a comprehensive listing of potential predetermined thresholds and buffer sizes. Instead, the user intent interpretation system 106 can implement any of a variety of predetermined thresholds for any of a variety of buffer sizes.

The user intent interpretation system 106 can interpret user intent based on these predetermined thresholds and further based on determined velocity of user input. For example, the user intent interpretation system 106 can determine that the velocity of user input is below at least one predetermined threshold corresponding to "lift off intent." Based on this determination, the user intent interpretation system 106 can determine that the user intends to utilize additional care and/or precision. More specifically, the user intent interpretation system 106 can determine that the user intends for any potential gesture terminating user input to terminate user input immediately upon initiation of the gesture.

Upon interpreting user intent, the user intent interpretation system 106 can proceed to act 422 of modifying system response based on user intent. As discussed above, the user intent interpretation system 106 can implement various modifications to the system output 202 based on a variety of interpretations of user intent. For example, as shown in act 422 of FIG. 4, the user has removed the user hand 406 from the modified digital object 402. In other words, the user has initiated a gesture terminating user input.

Based on detecting that the velocity of user input is below one or more predetermined thresholds, the user intent interpretation system 106 can implement a rolling buffer. Further, the user intent interpretation system 106 can utilize the velocity of user input and a set of predetermined thresholds to determine a size for the rolling buffer. That is, based a sufficiently low velocity of user input, the user intent interpretation system 106 can determine that a user intends to utilize increased precision and can determine a degree of precision to implement. Then, the user intent interpretation system 106 can generate and implement a rolling buffer of user input based on the velocity of user input.

The user intent interpretation system 106 can pass user input through the rolling buffer before passing the user input on for implementation. As mentioned above, the user intent interpretation system 106 can infer that the user wants to use increased precision, and therefore may want to terminate input. Accordingly, upon receiving a termination of input, such as the termination shown in FIG. 4, the user intent interpretation system 106 can discard any points of user input in the rolling buffer instead of passing them on for implementation. Further, the user intent interpretation system 106 can instead immediately pass on the termination of user input to a rendering engine for implementation.

Figure 5A:
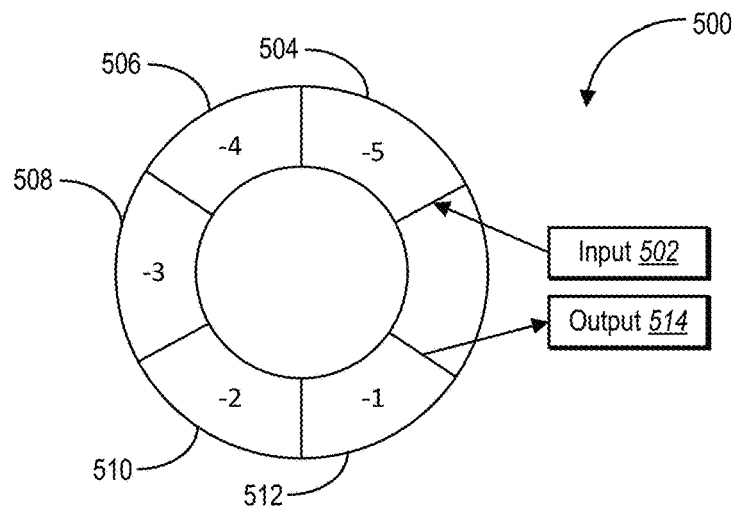
FIGS. 5A-5B illustrate implementation of a rolling buffer in accordance with one or more embodiments.
Figure 5B:
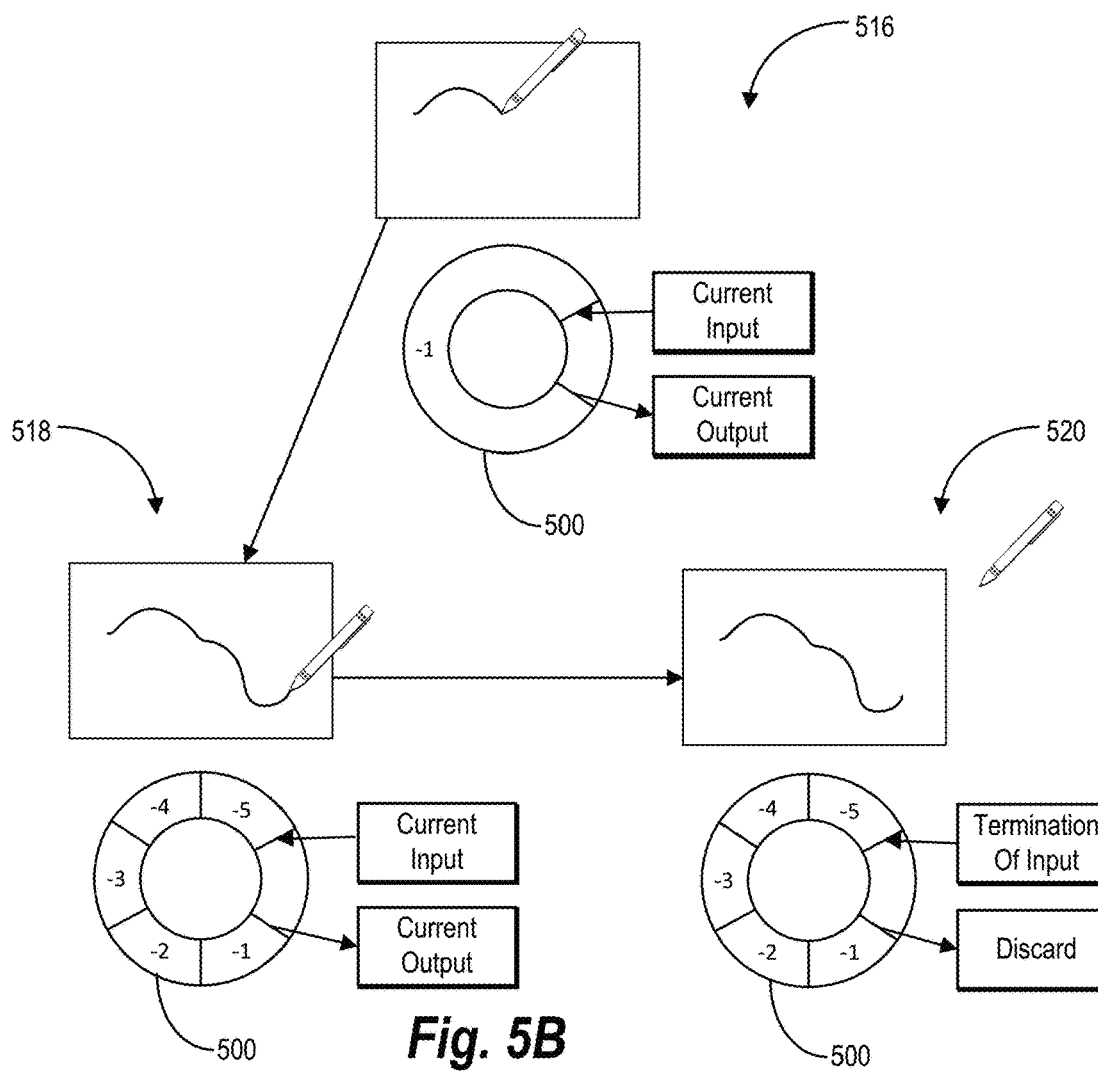

FIGS. 5A-5B illustrate additional detail with regard to the implementation of the rolling buffer. More specifically, FIGS. 5A-5B give a visual representation of example embodiment of a rolling buffer in order to illustrate the function of a rolling buffer. A rolling buffer is a data structure that utilizes a dynamically sized buffer to move points of user input through before implementation within a graphical user interface.

To illustrate, the rolling buffer 500 can receive a point of user input 502, and place that point of user input in the rolling buffer, effectively queuing the point of user input for implementation within the graphical user interface. The point of user input then travels through each of the user input slots 504-512 before being passed on for implementation in the graphical user interface. FIG. 5A illustrates the rolling buffer 500 as including five points of user input. However, as discussed above, the rolling buffer can contain various numbers of points of user input depending on the velocity of user input.

After a point of user input is "cycled" through the rolling buffer, the output 514 of the rolling buffer is passed on to a rendering engine for implementation via the graphical user interface. In other words, the rolling buffer 500 receives the points of user input 500 in the order that the user intent interpretation system 106 receives them. Then, after cycling the points of user input through the rolling buffer 500, the rolling buffer 500 passes the points of user input on to a rendering engine for implementation in the order in which the points of user input were received.

As shown in FIG. 5A, each of the user input slots 504-512 is labelled with a queue number for ease of explanation. These queue numbers reflect how many points of user input will be queued before the implementation of that point of user input. For example, two points of user input, including the point currently passing to the rendering engine, will be passed on to the rendering engine before the point of user input in the "−2" slot will be passed.

FIG. 5B illustrates the dynamic nature of the rolling buffer 500 and shows the implementation of the user intent interpretation system 106 lift off feature. More specifically, FIG. 5B illustrates graphical user interface states 516-520, including the graphical user interface and a corresponding rolling buffer 500. For example, graphical user interface state 516 shows the graphical user interface where the velocity of user input is below a predetermined threshold sufficient to implement a rolling buffer 500. More specifically, the graphical user interface state 516 illustrates a scenario in which the user intent interpretation system 106 determined that the rolling buffer should have a size of only one point of user input.

Accordingly, only one point of user input is stored in the rolling buffer 500 at a time before the user intent interpretation system 106 passes the stored point of user input on for implementation. The small size of the rolling buffer introduces only a very small delay before implementation of received user input. That is, there is very little delay between the receipt of a point of user input via the client device, receipt of the point of user input by the rolling buffer 500 and passing the point of user input to a rendering engine for implementation.

Next, graphical user interface state 518 shows the graphical user interface and rolling buffer 500 where the velocity of user input is lower than that of graphical user interface state 516. More specifically, user intent interpretation system 106 determines that the velocity of user input has slowed below an additional predetermined threshold(s). In response, the user intent interpretation system 106 dynamically increases the size of the rolling buffer 500. In the graphical user interface state 518, the user intent interpretation system 106 has increased the size of the rolling buffer 500 to hold five points of user input before passing each point on for implementation.

In one or more embodiments, to modify the rolling buffer 500 from holding one point of user input to holding five points of user input, the user intent interpretation system 106 gradually, point by point, increases the size of the rolling buffer 500. That is, the user intent interpretation system 106 can determine that the velocity of user input is below an additional predetermined threshold relative to graphical user interface state 516. In response, the user intent interpretation system 106 can increase the size of the rolling buffer 500 to two points of user input. Then, the user intent interpretation system 106 can determine that the velocity of user input moved below an additional predetermined threshold. In response to that determination, the user intent interpretation system 106 can increase the size of the rolling buffer 500 to three points of user input, and so on. Utilizing this method, in the illustrated embodiment, the user intent interpretation system 106 determines that the rolling buffer 500 should contain five points of user input.

As the rolling buffer contains five points of user input at a time, the delay between receiving user input and eventual implementation is greater than that described with regard to graphical user interface state 516. However, because graphical user interface state 518 depicts a scenario in which the velocity of user input is quite low, such a delay will not cause an appearance of lag relative to user input. Instead, the user can interpret this delay as a positive reflection of the user's intent to utilize additional precision at a low velocity of user input. That is, the delay introduced by a rolling buffer 500 that includes five points of user input is longer than that of a rolling buffer that includes one point of user input. However, in one or more embodiments, neither size of rolling buffer is likely to introduce a degree of delay perceptible to the user.

Then, in graphical user interface state 520, the user intent interpretation system 106 receives a "lift off input" or a gesture that terminates user input from the graphical user interface. Upon receiving this termination of user input at a sufficiently low velocity that the user intent interpretation system 106 has implemented a rolling buffer, the user intent interpretation system 106 can infer that the user intends to terminate user input immediately upon initiating the lift off gesture. Accordingly, in one or more embodiments, upon receiving a termination of user input, the user intent interpretation system 106 discards the contents of the rolling buffer 500. Further, the user intent interpretation system 106 passes the termination of user input on to a rendering engine for implementation via the graphical user interface.

Thus, the user intent interpretation system 106 avoids implementation of any "wobble" or slide input during the process of the termination of user input. By utilizing the rolling buffer, the user intent interpretation system 106 is able make determinations for a specific point of user input utilizing other points of user input received after the specific point. This gives the user intent interpretation system 106 greater context as to the specific point of user input to draw from in determining how to treat the specific point of user input. Accordingly, the user intent interpretation system 106 can utilize information from later in time when determining whether and how to implement a point of user input.

Figure 6:
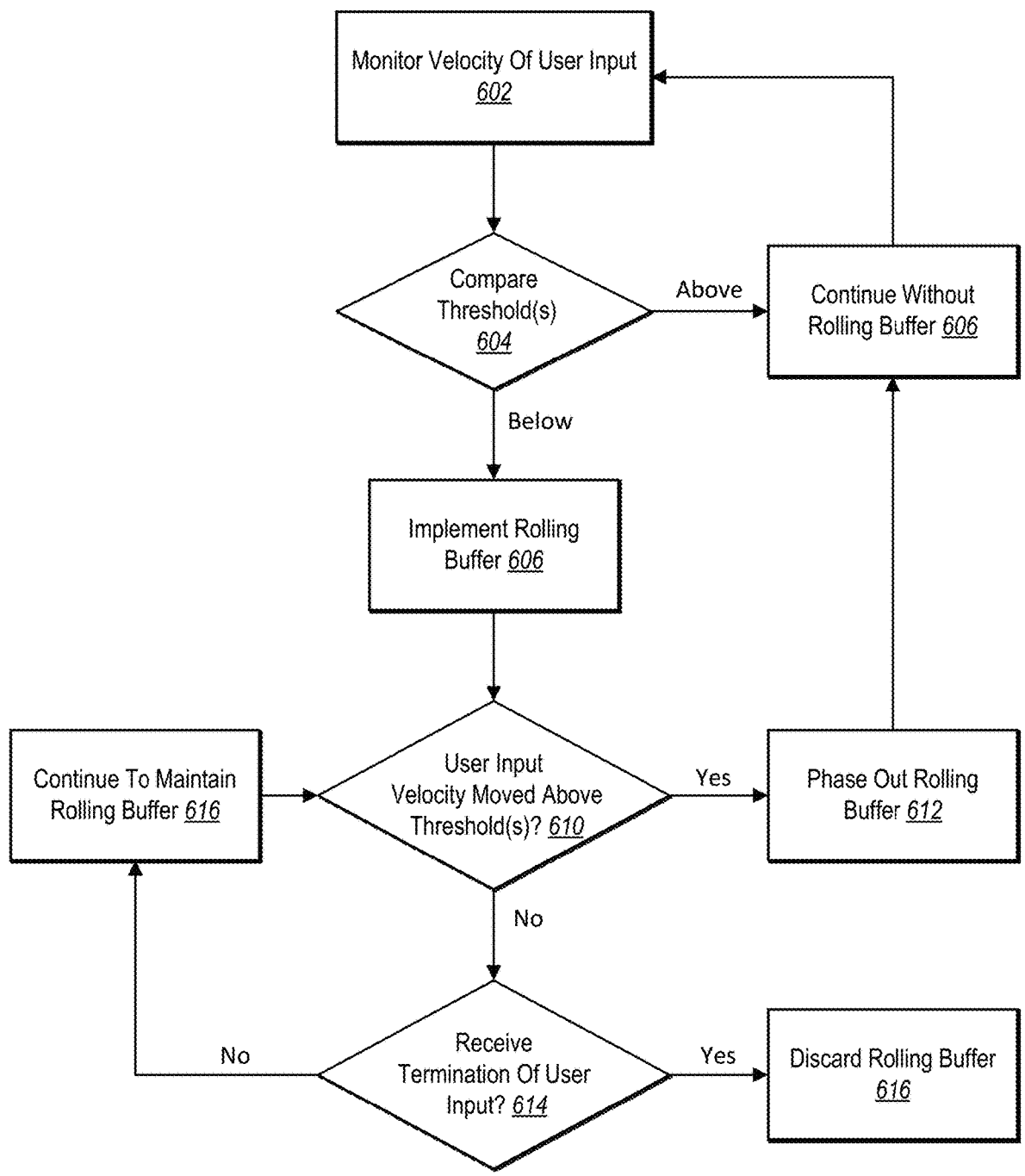
FIG. 6 illustrates a state diagram for utilizing a rolling buffer in response to interpreting a termination of user input in accordance with one or more embodiments.

FIG. 6 provides additional detail for the process of generating and implementing a rolling buffer and implementing modified graphical user interface output in response to receiving a termination of user input. For example, the user intent interpretation system 106 can perform act 602 of monitoring the velocity of user input. As discussed above, the user intent interpretation system 106 can dynamically the velocity of user input. Further, as discussed above, the user intent interpretation system 106 can monitor the velocity of user input in a variety of different contexts. That is, similar to the discussion above with regard to act 302, the user intent interpretation system 106 can monitor user input from a variety of user input devices. Additionally, the user intent interpretation system 106 can monitor interactions with a variety of graphical user interface element types.

Then, the user intent interpretation system 106 can perform act 604 of comparing the velocity of user input to a set of thresholds. In particular, the user intent interpretation system 106 can compare the velocity of user input to a set of predetermined thresholds corresponding to whether the user intent interpretation system 106 should implement a rolling buffer 500 and what size the rolling buffer 500 should be. As discussed above with regard to FIG. 3, the predetermined thresholds can be determined and/or modified via the client device and/or the server device(s) 110. If the user intent interpretation system 106 determines that the velocity of user input is above the predetermined threshold(s), then the user intent interpretation system 106 can proceed to act 606 of continuing without a rolling buffer.

However, if the user intent interpretation system 106 determines that the velocity of user input is below at least one of the set of predetermined thresholds, then the user intent interpretation system 106 can proceed to act 608 of implementing a rolling buffer 500. As discussed above with regard to FIGS. 5A-5B, the user intent interpretation system 106 can generate a rolling buffer and can pass points of user input through the rolling buffer 500 before passing the user input on to a rendering engine for implementation via the graphical user interface. As also discussed with regard to FIG. 5B, the user intent interpretation system 106 can dynamically modify the size of the rolling buffer 500 based on the velocity of user input.

Then, the user intent interpretation system 106 can proceed to act 610 of determining whether the velocity of user input has moved above the predetermined threshold(s). If the user intent interpretation system 106 determines that the velocity of user input has returned above the predetermined threshold(s), the user intent interpretation system 106 can proceed to act 612 of phasing out the rolling buffer 500. That is, as discussed above, the user intent interpretation system 106 can gradually, point by point, reduce the size of the rolling buffer until the rolling buffer 500 contains a single point of user input, and then can eliminate the use of the rolling buffer 500 altogether. Then, the user intent interpretation system 106 can return to act 606 and can continue without a rolling buffer 500.

However, if the user intent interpretation system 106 determines at act 610 that the velocity of user input has not moved above the predetermined threshold(s), the user intent interpretation system 106 can proceed to act 614 of determining whether the user intent interpretation system 106 has received a termination of user input. That is, the user intent interpretation system 106 can determine if the graphical user interface is no longer receiving user input. Then, if the user intent interpretation system 106 determines that the graphical user interface has not received a termination of user input, the user intent interpretation system 106 can proceed to act 616 of continuing to maintain rolling buffer.

The act 616 of continuing to maintain a rolling buffer can include dynamically modifying the size of the rolling buffer. As discussed above, the user intent interpretation system 106 can continuously monitor the velocity of user input and can dynamically modify the size of the rolling buffer based on the velocity of user input. Accordingly, the user intent interpretation system 106 can ensure a smooth user experience notwithstanding potential changes in the size of the rolling buffer 500 over time.

If the user intent interpretation system 106 determines at act 614 that the graphical user interface has received a termination of user input, then the user intent interpretation system 106 can proceed to act 616 of discarding the rolling buffer. More specifically, the user intent interpretation system 106 can discard each point of input that is in the rolling buffer at the time that the user intent interpretation system 106 receives the termination of input. Then, the user intent interpretation system 106 can instead pass the termination of input on to a rendering engine for implementation via the graphical user interface immediately.

If the user intent interpretation system 106 receives a termination of input via the graphical user interface when there is no rolling buffer 500 implemented, the user intent interpretation system 106 can process each point of user input and the termination of user input sequentially without discarding any points of user input. That is, the user intent interpretation system 106 can infer from the higher velocity of user input that the user is not seeking precision. Accordingly, the user intent interpretation system 106 can decline to modify the system output 202 upon termination of user input.

As discussed briefly above, the user intent interpretation system 106 can make multiple interpretations of user intent and implement multiple changes, based on those interpretations, at the same time. More specifically, the user intent interpretation system 106 can implement both modifications to the scale of system output 202 relative to user input and modifications upon the termination of user input. FIG. 7 illustrates the simultaneous implementation of these modifications in accordance with one or more embodiments. More specifically, FIG. 7 shows the input appearance, velocity of user input, state of the lift off rolling buffer 500, and the state of the precision input velocity control. FIG. 7 illustrates the state of each of these at three times: Time 1, Time 2, and Time 3.

For example, at Time 1, the graphical user interface shows the graphical user interface with the system output 202 tracking slightly behind the user input implement 204. That is, Time 1 includes an output gap as a result of modifications to the scale of the system output 202 relative to user input. Like FIGS. 2B-2C, FIG. 7 shows an exaggerated delay relative to the input implement for ease of illustration.

FIG. 7 also shows that the velocity of user input at Time 1 is 25 points per second. As a result of this velocity of user input, the user intent interpretation system 106 can interpret the user's intent to utilize additional precision. Based on the velocity of user input, the user intent interpretation system 106 modifies the scale of the system output 202 relative to the scale of user input. As mentioned, this modification introduces an output gap.

Also as illustrated in FIG. 7, based on the input velocity of 25 points per second, the user intent interpretation system 106 implements a rolling buffer containing three points of user input. Upon passing points of user input through the rolling buffer and as output to the graphical user interface, the user intent interpretation system 106 further modifies the output velocity and scale of the graphical user interface output. That is, the user intent interpretation system 106 implements the modified scale of the system output 202 relative to the scale of user input in addition to any delay introduced by the rolling buffer.

As shown in FIG. 7, the user intent interpretation system 106 modifies the scale and velocity of graphical user interface output at 90% of that of the user input. Accordingly, in this example embodiment, the user intent interpretation system 106 implements the output velocity at 22.5 points per second when the input velocity is 25 points per second, and objects within the graphical user interface move 9 points for every 10 points moved by the user input.

Moving to Time 2, the appearance of the graphical user interface shows the output tracking farther behind the user input than at Time 2. FIG. 7. also shows that the velocity of user input is 15 points per second at Time 2. As with Time 1, based on the velocity of user input, the user intent interpretation system 106 interprets that the user desires additional precision of input. Thus, the user intent interpretation system 106 makes multiple modifications to system output 202 based on the velocity of user input and various predetermined thresholds.

The user intent interpretation system 106, based on this velocity of user input, modifies the rolling buffer 500 at Time 2 to a size of four points of input. That is, the user intent interpretation system 106 dynamically modifies the size of the rolling buffer based on the velocity of user input. Because the velocity of user input is below one additional predetermined threshold compared to Time 1, the user intent interpretation system 106 causes the rolling buffer 500 to include one additional point of user input.

Then, as shown in FIG. 7, after the points of user input are passed through the rolling buffer 500 and on to the rendering engine, the user intent interpretation system 106 modifies the scale and velocity of that output by 80%, based on the velocity of user input. That is, because the velocity of user input is 15 points per second, the user intent interpretation system 106 presents the movement of the graphical user interface at 80% of that in scale and velocity. Accordingly, the velocity of user output is 12 points per second, and objects in the graphical user interface move 12 points for every 15 points moved by the user input.

At Time 3, FIG. 7 illustrates the time at which the user intent interpretation system 106 receives a termination of user input. More specifically, the appearance of the graphical user interface shows that the user input implement 404 has lifted off from the touch screen, and accordingly there is no velocity of user input.

At this time, however, there are still points of input in the rolling buffer 500 from before the termination of user input. However, the user intent interpretation system 106 does not pass those points of user input stored in the rolling buffer 500 on for implementation. Instead, upon receiving the termination of user input, the user intent interpretation system 106 immediately discards the points of user input contained in the rolling buffer 500. Then, instead of passing on those points, the user intent interpretation system 106 passes on the termination of user input on for implementation via the graphical user interface immediately. Accordingly, the precision input velocity control does not receive any points of input, and there is no movement within the graphical user interface.

Figure 8A:
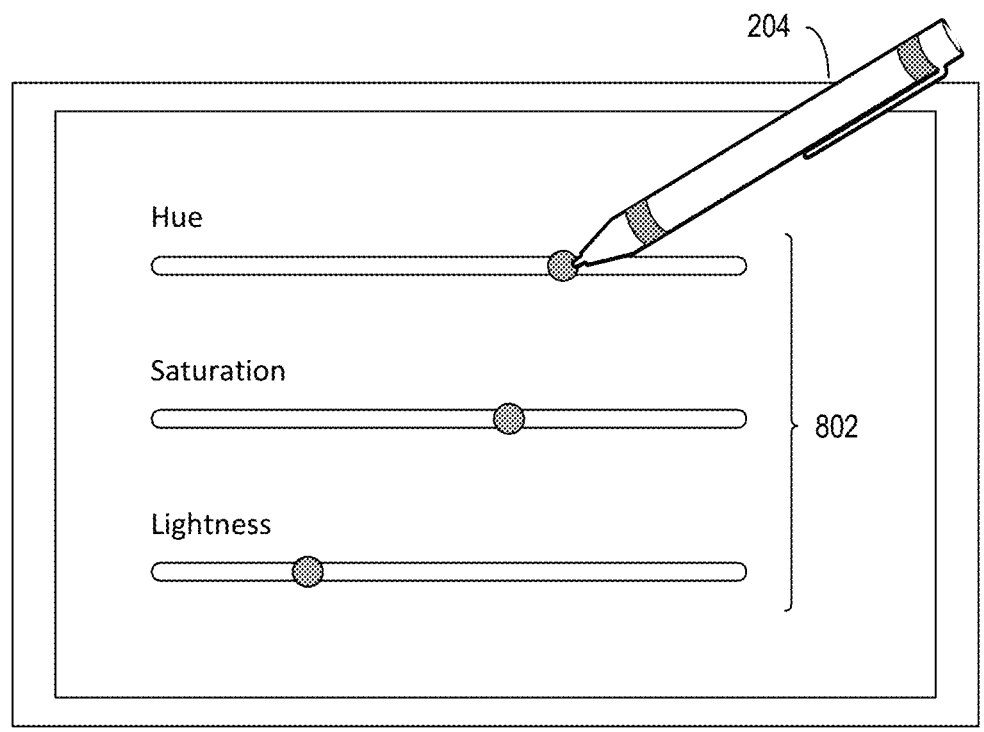
FIGS. 8A-8B illustrate example graphical user interface elements and use cases in which the user intent interpretation system can adjust interactions with in accordance with one or more embodiments.

While the preceding discussion presents the user intent interpretation system 106 in the context of drawing content or moving content through the graphical user interface, the user intent interpretation system 106 can be implemented for a variety of input types. For example, as illustrated in FIG. 8A, the user intent interpretation system 106 can detect input and modify system output 202 in the context of selectable options in a graphical user interface, such as a slider. That is, the user intent interpretation system 106 can modify the scale of system output 202 relative to user input in the context of a selectable graphical user interface element. Further, the user intent interpretation system 106 can implement a rolling buffer in the context of a selectable graphical user interface element. As shown in FIG. 8A, the user input implement 204 can move color setting bars 802.

Figure 8B:
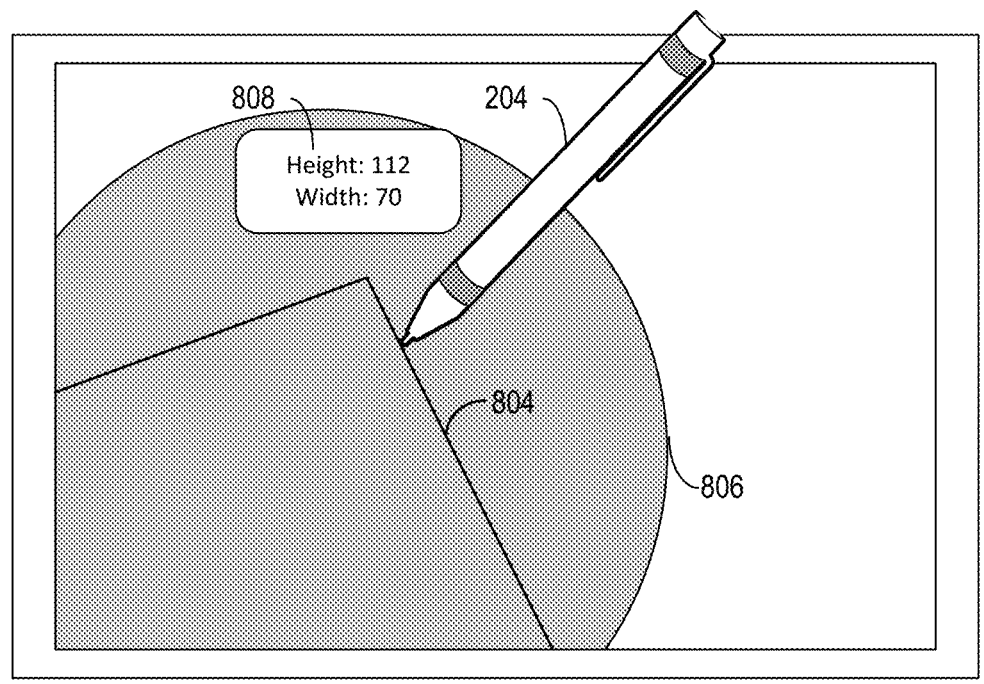

Further, as illustrated in FIG. 8B, the user intent interpretation system 106 can detect user input and modify user output accordingly in the context of moving digital objects through the graphical user interface. As discussed with regard to FIG. 4, the user intent interpretation system 106 can monitor and interpret user input where the user moves and/or modifies a digital object within a graphical user interface. For example, as shown in FIG. 8B, the user intent interpretation system 106 can interpret user modification of the digital rectangle 804 and/or the digital circle 806.

That is, as shown in FIG. 8B, the user intent interpretation system 106 can implement changes in moving, placing, resizing, creating, or performing other actions with regard to digital content items. FIG. 8B illustrates the user input implement 204 resizing the digital rectangle 804. Accordingly, the user intent interpretation system 106 can monitor the user input of the user intent interpretation system 106 "dragging" the edge of the digital rectangle 804. Then, the user intent interpretation system 106 can determine the velocity of that user input. Thus, the user intent interpretation system 106 can interpret user intent based on the user input and can implement modifications to system output 202.

In such an environment, the user intent interpretation system 106 can determine round numbers that are understandable for the user to present in the context of providing information to the user about their edits. The digital object information bubble 808 illustrates an example embodiment of a graphical user interface element that presents values corresponding to the user input. As shown in FIG. 8B, the digital object information bubble 808 includes the height and width of the object selected by the user input implement 204, the digital rectangle 804. The digital object information bubble 808 is shown as a rounded rectangle in a different color from its background. However, the user intent interpretation system 106 can present the digital object information bubble in accordance with a variety of designs that reflect that the digital object information bubble 808 includes information about a selected graphical user interface element.

As depicted in FIG. 8B, the digital object information bubble 808 includes information about the size of the selected graphical user interface element. However, the digital object information bubble can include a variety of information about a selected graphical user interface element. For example, the digital object information bubble 808 can include information about the color of the selected graphical user interface element, any angles of the selected graphical user interface element, or the distance between the selected graphical user interface element and another graphical user interface element.

The digital object information bubble 808 can also include information about the user's current input in order to assist the user in implementing precise input. For example, the digital object information bubble 808 can include information about the velocity of user input, currently-implemented modifications to the system output 202, an interpreted intent, or any other information about the user input. In one or more embodiments, the user intent interpretation system 106 may present multiple digital object information bubbles 808 corresponding to multiple relevant aspects of the selected graphical user interface element and/or the user input.

The user intent interpretation system 106 can provide round numbers corresponding to information about a selected graphical user interface element. For example, as shown in FIG. 8B, digital object information bubble 808 provides whole numbers corresponding to the size of the selected object. As shown, the user intent interpretation system 106 can round the numbers corresponding to the size of the digital rectangle 804 to the nearest whole number. However, in one or more embodiments, the user intent interpretation system 106 can also round the numbers corresponding to the digital rectangle 804 to a various precisions, such as the nearest tens place, tenths place, or hundredths place.

Figure 9:
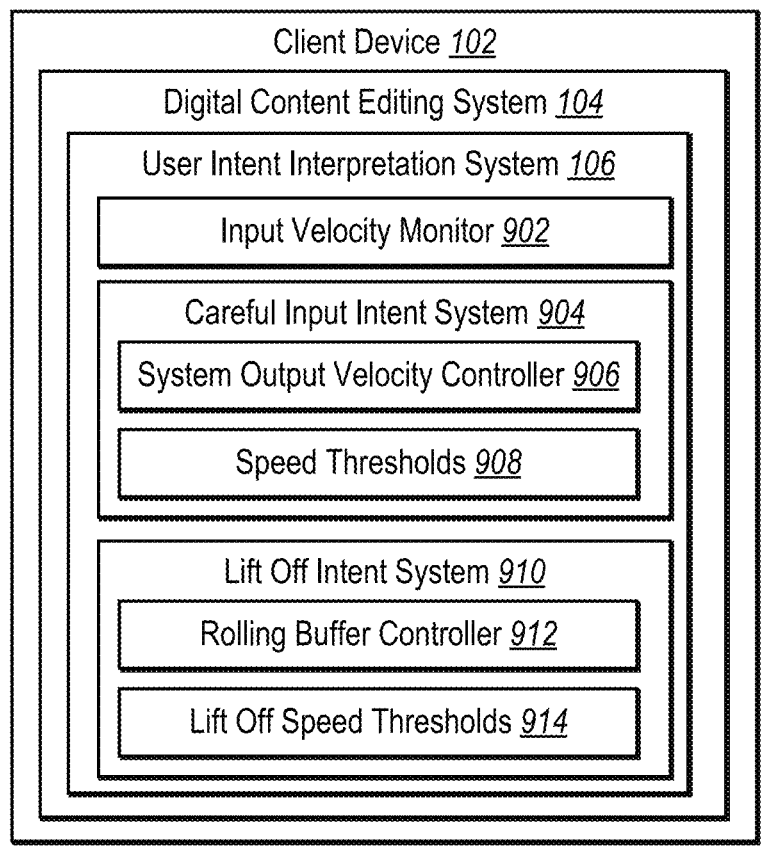
FIG. 9 illustrates a block diagram of a user intent interpretation system in accordance with one or more embodiments.

FIG. 9 illustrates a schematic diagram of a computing device upon which at least a portion of the user intent interpretation system 106 can be implemented in accordance with one or more embodiments. Each of the components 902-914 of the user intent interpretation system 106 can include software, hardware, or both. For example, the components 902-914 can include one or more instructions stored on a computer-readable storage medium and executable by processors of one or more computing devices, such as a client device or server device. When executed by the one or more processors, the computer-executable instructions of the user intent interpretation system 106 can cause the computing device(s) to perform the methods described herein. Alternatively, the components 902-914 can include hardware, such as a special-purpose processing device to perform a certain function or group of functions. Alternatively, the components 902-914 of the user intent interpretation system 106 can include a combination of computer-executable instructions and hardware.

As shown in FIG. 9, the user intent interpretation system 106 can include the input velocity monitor 902. The input velocity monitor can continuously monitor the velocity of various types of user input. Further, the input velocity monitor can monitor the velocity of user input utilizing various measurement types. Additionally, the user input velocity monitor 902 can communicate the velocity of user input to various other portions of the user intent interpretation system 106.

Additionally, as shown, the user intent interpretation system 106 can include the precision input intent system 904. The precision input intent system 904 can interpret, based on the velocity of user input, whether the user intends to utilize additional precision. Then, upon determining that the user does intend to utilize additional precision, the precision input intent system 904 can modify the scale of system output 202 relative to the scale of user input. Further, the precision input intent system 904 can determine the degree to which to modify the system output 202 relative to the user input based on a set of predetermined thresholds.

The precision input intent system 904 can also include the system output velocity controller 906. The system output velocity controller 906 can implement determined changes to the scale of system output 202 relative to the scale of user input. For example, system output velocity controller 906 can modify the velocity of the system output 202 relative to user input. Additionally, the system output velocity controller 906 can modify any movement of an object within the graphical user interface relative to user input.

Additionally, the precision input intent system 904 can include the speed thresholds 908. The speed thresholds 908 can include predetermined thresholds related to modifying the scale of system output 202 relative to user input. The speed thresholds 908 can also include scaling values corresponding to the predetermined thresholds.

As shown in FIG. 9, the user intent interpretation system 106 can also include the lift off intent system 910. The lift off intent system 910 can determine, based on the velocity of user input, that the user intends to utilize increased precision. Then, based on that determination, the lift off intent system 910 can implement a rolling buffer 500. The lift off intent system 910 can then pass points of user input through the rolling buffer 500 before passing them on to a rendering engine for implementation via a graphical user interface. The lift off intent system 910 can also dynamically modify the size of the rolling buffer 500. Upon detecting a termination of user input, the lift off intent system 910 can discard any points of user input in the rolling buffer 500. Then, the lift off intent system 910 can immediately pass the termination of user input on to the rendering engine for implementation.

Additionally, the lift off intent system 910 can include the rolling buffer controller 912. The rolling buffer controller 912 can implement the rolling buffer and any determined modifications to the rolling buffer 500. That is, the rolling buffer controller 912 can dynamically modify the size of the rolling buffer based on the velocity of user input and one or more predetermined thresholds. Additionally, the rolling buffer controller 912 can discard the points of user input from the rolling buffer in response to detecting a termination of user input.

Further, the lift off intent system 910 can include the lift off speed thresholds 914. The lift off speed thresholds 914 can include predetermined thresholds related to implementing and/or dynamically modifying the size of a rolling buffer 500. The lift off speed thresholds 914 can also include sizes for the rolling buffer 500 corresponding to the predetermined thresholds.

Furthermore, the components 902-914 of the user intent interpretation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-914 may be implemented as a stand-alone application, such as a desktop or mobile application. Furthermore, the components 902-914 may be implemented as one or more web-based applications hosted on a remote server. The components 902-914 may also be implemented in a suite of mobile device applications or "apps." To illustrate, the components 902-914 may be implemented in an application, including but not limited to ADOBE® PHOTOSHOP®, ADOBE® PHOTOSHOP® ELEMENTS, ADOBE® PHOTOSHOP® EXPRESS, ADOBE® PHOTOSHOP® FIX, ADOBE® PHOTOSHOP® MIX, ADOBE® PHOTOSHOP® SKETCH, and ADOBE® ACROBAT, which are either registered trademarks or trademarks of Adobe Systems Incorporated in the United States and/or other countries.

Figure 10:
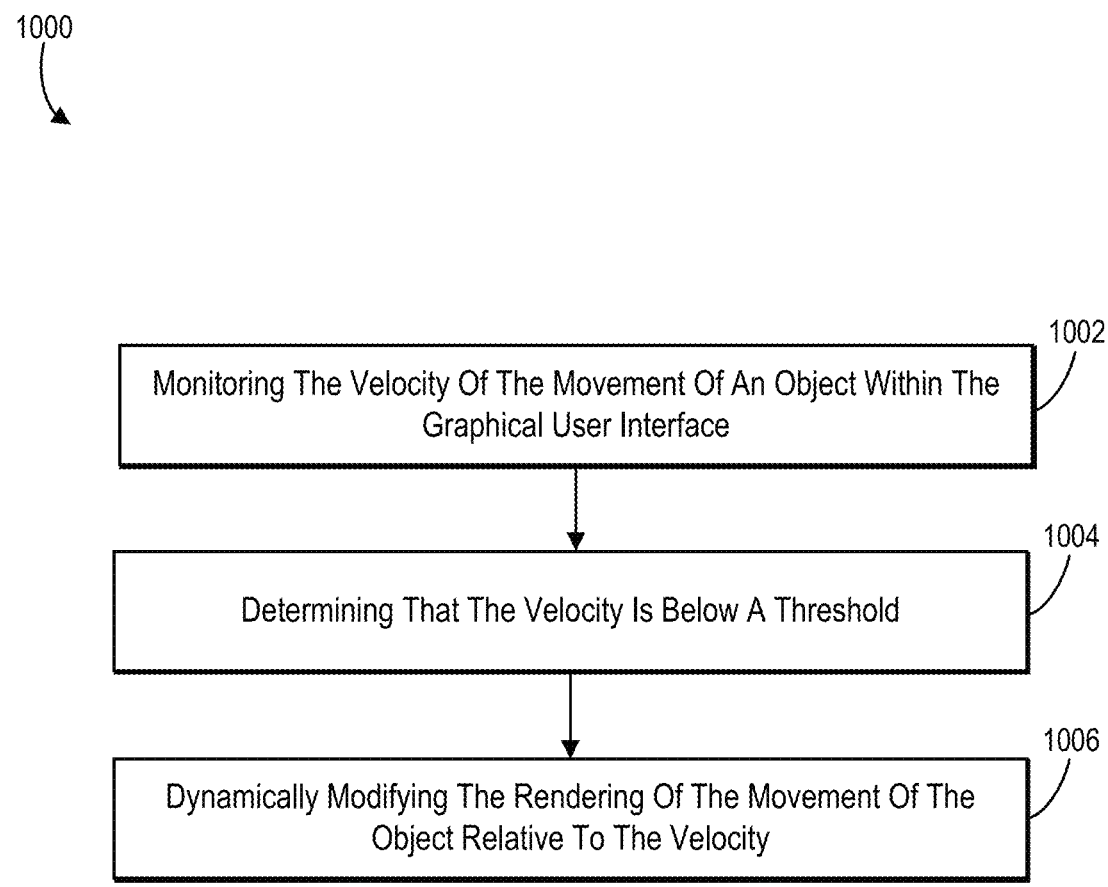
FIG. 10 illustrates a flow chart of a series of acts for dynamically modifying the movement of a graphical user interface object relative to the velocity of user input.

FIGS. 1-9, the corresponding text, and the examples provide a number of different methods, systems, devices, and non-transitory computer-readable media of the user intent interpretation system 106. In addition to the foregoing, one or more embodiments can also be described in terms of flowcharts comprising acts for accomplishing a particular result, as shown in FIGS. 9-10. Additionally, the acts described herein may be repeated or performed in parallel with one another or parallel with different instances of the same or similar acts.

Figure 11:
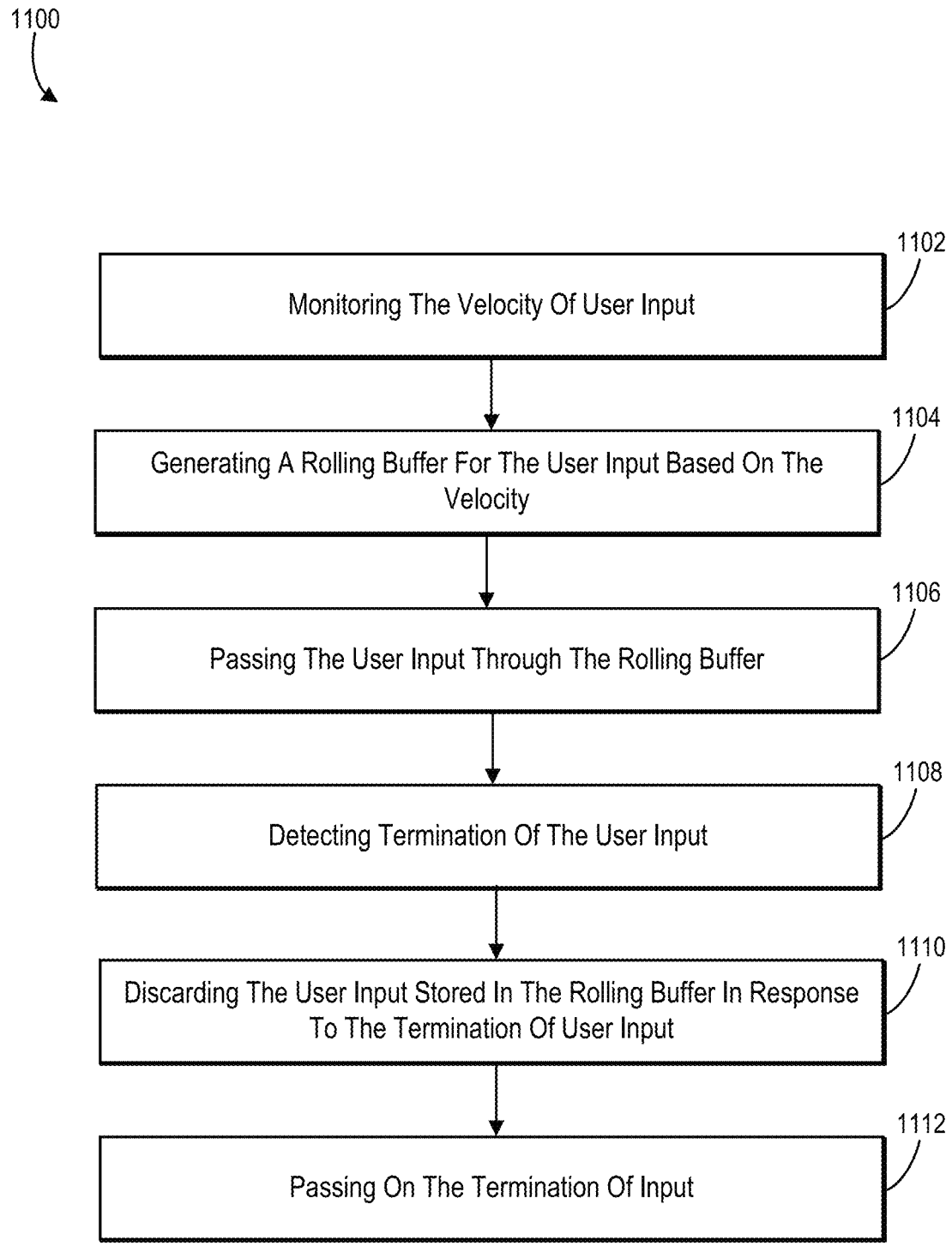
FIG. 11 illustrates a flow chart of a series of acts for dynamically modifying graphical user interface output of a lift off gesture in response to detecting a termination of input.

While FIGS. 10-11 illustrate acts according to one embodiment, alternative embodiments may omit, add to, reorder, and/or modify any of the acts shown in FIGS. 10-11. The series of acts 1000, 1100 can be performed as part of a method. Alternatively, a non-transitory computer-readable medium can comprise instructions that, when executed by one or more processors, cause a computing device to perform the series of acts 1000, 1100. In some embodiments, a system can perform the series of acts 1000, 1100.

As shown in FIG. 10, the series of acts 1000 includes an act 1002 for monitoring the velocity of the movement of an object within the graphical user interface. In particular, the act 1002 can include monitoring, via a touch screen, the velocity of user input comprising the movement of an object within a graphical user interface.

Additionally, as shown in FIG. 10, the series of acts 1000 includes an act 1004 for determining that the velocity is below a threshold. In particular, the act 1004 can include determining that the velocity of user input is below a predetermined threshold. Specifically, the act 1004 can include utilizing a minimum velocity of the movement relative to the velocity of user input. Additionally, in one or more embodiments, the act 1004 can include implementing the minimum velocity of movement relative to the velocity of user input in response to detecting that the velocity of user input is below a minimum threshold.

Further, as shown in FIG. 10, the series of acts 1000 includes an act of 1006 for dynamically modifying the rendering of the movement of the object relative to the velocity. In particular, the act 1006 can include dynamically modifying, in response to detecting that the velocity of user input is below the predetermined threshold and based on the velocity of user input, the rendering of the movement of the object within the graphical user interface relative to the velocity of the user input. Specifically, the act 1006 can include detecting that the velocity of user input has returned above the predetermined threshold, and incrementally returning the rendering of the movement of the object within the graphical user interface to a default state. Additionally, in one or more embodiments, the act 1006 can include wherein the default state comprises rendering the movement of the object within the graphical user interface with a velocity equal to the velocity of the user input.

Further, the act 1006 can include wherein dynamically modifying the rendering of the movement of the object within the graphical user interface relative to the velocity of the user input comprises scaling the movement of the object within the graphical user interface relative to the velocity of user input. Also, the act 1006 can include wherein the movement of the object within a graphical user interface comprises movement of a selectable user interface element. The act 1006 can also include wherein the movement of an object within a graphical user interface comprises movement of the object across the graphical user interface.

Moving to FIG. 11, the series of acts 1100 includes an act 1102 of monitoring the velocity of user input. In particular, the act 1102 can include monitoring the velocity of points of user input received via a graphical user interface. Specifically, the act 1102 can include wherein the user input comprise movement of a selectable user interface element, wherein the user input comprises movement of a digital object in the graphical user interface, and/or wherein the user input comprises touch input to a touch screen.

Further, as shown in FIG. 11, the series of acts 1100 includes an act 1104 of generating a rolling buffer for the user input based on the velocity. In particular, the act 1104 can include generating, based on the velocity of the points of user input, a rolling buffer for the points of user input. Specifically, the act 1104 can include utilizing one or more thresholds for the velocity of the points of user input to determine whether to implement the rolling buffer and determining a size for the rolling buffer. Additionally, the act 1104 can include determining that the velocity of the points of user input is above a predetermined threshold and phasing out the rolling buffer in response to determining that the velocity of the points of user input is above the predetermined threshold.

As shown in FIG. 11, the series of acts 1100 includes an act 1106 of passing the user input through the rolling buffer. In particular, the act 1106 can include passing the points of user input through the rolling buffer before implementation of the points of user input. Specifically, the act 1106 can include determining, based on the velocity of the points of user input, a number of points of user input stored in the rolling buffer, detecting a change in the velocity of the points of user input, and dynamically modifying, based on the change in the velocity of the points of user input, the number of points of user input stored in the rolling buffer.

Additionally, the act 1106 can include determining that the velocity of user input is below a predetermined threshold, and dynamically modify, in response to detecting that the velocity of user input is below the predetermined threshold and based on the velocity of user input, the rendering of the movement of the object within the graphical user interface. Further, the act 1106 can include wherein determining that the velocity of the points of user input is below a predetermined threshold is based, at least in part, on points of user input received from the rolling buffer. The act 1106 can also include wherein instructions causing the computer system to dynamically modify the rendering of the movement of the object within the graphical user interface relative to the velocity of the user input further cause the computer system to scale the movement of the object within the graphical user interface relative to the velocity of user input.

Also, as shown in FIG. 11, the series of acts 1100 includes an act 1108 of detecting the termination of the user input. Additionally, as shown in FIG. 11, the series of acts 1100 includes an act 1110 of discarding the user input stored in the rolling buffer in response to the termination of user input. In particular, the act 1110 can include discarding, in response to the termination of user input, one or more points of the user input stored in the rolling buffer at the time of the termination of the user input. Specifically, the act 1110 can include declining to implement the one or more points of user input stored in the rolling buffer. The act 1110 can also include determining not to pass the one or more points of user input on to a rendering engine for implementation via a graphical user interface Moreover, as shown in FIG. 11, the series of acts 110 includes an act 1112 of passing on the termination of user input. In particular, the act 1112 can include passing the termination of input for implementation. Additionally the act 1112 can include passing an indication of the termination of the user input for implementation on to a rendering engine for implementation via a graphical user interface.

In addition (or in the alternative) to the acts described above, in some embodiments, the series of acts 1000, 1100 includes a step for modifying the rendering of movement within the graphical user interface based on the velocity of user input. The methods and acts and algorithms described in relation to FIG. 3 can comprise the corresponding acts and algorithms (e.g., structure) for a step for modifying the rendering of movement within the graphical user interface based on the velocity of user input.

Further, in addition (or in the alternative) to the acts described above, in some embodiments, the series of acts 1000, 1100 includes a step for modifying system output based on detecting a termination of user input. The methods and acts and algorithms described in relation to FIG. 6 can comprise the corresponding acts and algorithms (e.g., structure) for a step for modifying system output based on detecting a termination of user input.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
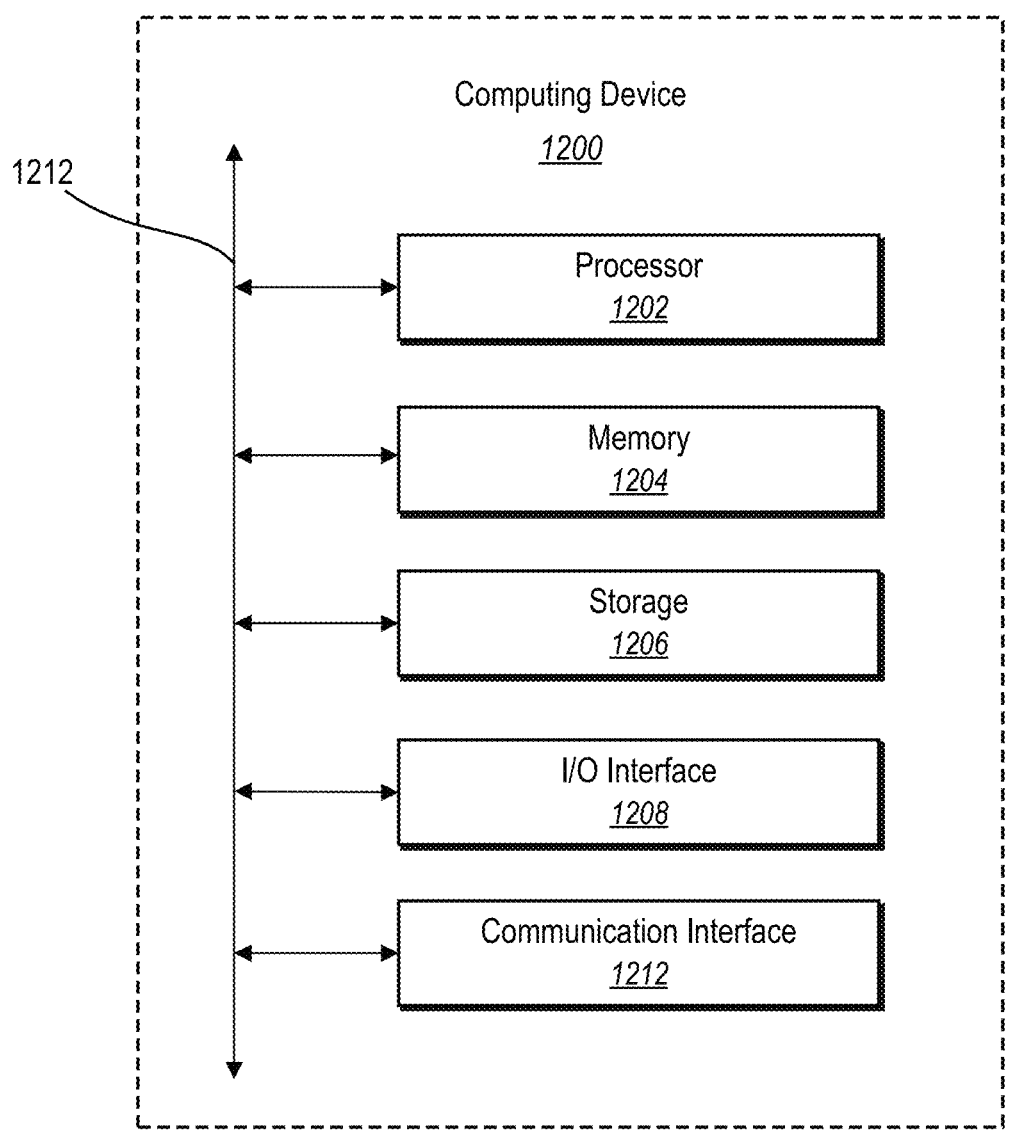
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200 may represent the computing devices described above (e.g., user device 102 or server device(s) 110). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:
1. A system comprising:
at least one processor; and at least one non-transitory computer readable-storage medium storing instructions thereon that, when executed by the at least one processor, cause the system to:
- monitor, via a touch device, a velocity of a touch input within a graphical user interface;
- render pixels corresponding to the touch input within the graphical user interface based on the velocity of the touch input;
- determine that the velocity of the touch input is below a predetermined threshold; and
- dynamically modify, in response to determining that the velocity of the touch input is below the predetermined threshold and based on the velocity of the touch input, rendering of the pixels corresponding to the touch input within the graphical user interface to move at a rendering velocity less than the velocity of the touch input by:
  - generating a rendering gap between a location of the touch input on the touch device and a location of the pixels within the graphical user interface; and
  - dynamically updating the rendering gap according to changes in the velocity of the touch input.

2. The system of claim 1, further comprising instructions that, when executed by the at least one processor, further cause the system to:
- detect that the velocity of the touch input has returned above the predetermined threshold; and
- in response to detecting that the velocity of the touch input has returned above the predetermined threshold, incrementally return the rendering of the pixels corresponding to the touch input within the graphical user interface to a default state.

3. The system of claim 2, wherein the instructions, when executed by the at least one processor, cause the system to incrementally return the rendering of the pixels corresponding to the touch input within the graphical user interface to the default state by:
- incrementally increasing the rendering velocity until reaching the velocity of the touch input; and
- reducing the rendering gap with the increasing of the rendering velocity until the location of the touch input on the touch device and the location of the pixels within the graphical user interface realign.

4. The system of claim 1, wherein the instructions, when executed by the at least one processor, cause the system to dynamically modify the rendering of the pixels corresponding to the touch input within the graphical user interface to move at the object rendering velocity less than the velocity of the touch input by scaling the rendering velocity to a proportion of the velocity of the touch input.

5. The system of claim 4, further comprising instructions that, when executed by the at least one processor, cause the system to maintain the rendering velocity above a minimum velocity of movement.

6. The system of claim 5, further comprising instructions that, when executed by the at least one processor, cause the system to implement the minimum velocity of movement for the rendering velocity in response to detecting a decrease in the velocity of the touch input below a minimum threshold.

7. The system of claim 1, wherein the rendering velocity comprises a velocity of movement of a selectable user interface element.

8. The system of claim 1, wherein rendering the pixels corresponding to the touch input within the graphical user interface comprises rendering movement of the pixels across the graphical user interface.

9. A non-transitory computer-readable medium storing instructions thereon that, when executed by at least one processor, cause a computing device to:
- monitor, via a touch device, a velocity of a touch input within a graphical user interface;
- render pixels corresponding to the touch input within the graphical user interface based on the velocity of the touch input;
- determine that the velocity of the touch input is below a predetermined threshold; and
- dynamically modify, in response to determining that the velocity of the touch input is below the predetermined threshold and based on the velocity of the touch input, rendering of the pixels corresponding to the touch input within the graphical user interface to move at a rendering velocity less than the velocity of the touch input by:
  - generating a rendering gap between a location of the touch input on the touch device and a location of the pixels within the graphical user interface; and
  - dynamically updating the rendering gap according to changes in the velocity of the touch input.

10. The non-transitory computer-readable medium of claim 9, further comprising instructions that, when executed by the at least one processor, further cause the computing device to:
- detect that the velocity of the touch input has returned above the predetermined threshold; and
- in response to detecting that the velocity of the touch input has returned above the predetermined threshold, incrementally return the rendering of the pixels corresponding to the touch input within the graphical user interface to a default state.

11. The non-transitory computer-readable medium of claim 10, further comprising instructions that, when executed by the at least one processor, cause the computing device to incrementally return the rendering of the pixels corresponding to the touch input within the graphical user interface to the default state by:
- incrementally increasing the rendering velocity until reaching the velocity of the touch input; and
- reducing the rendering gap with the increasing of the rendering velocity until the location of the touch input on the touch device and the location of the object pixels within the graphical user interface realign.

12. The non-transitory computer-readable medium of claim 9, further comprising instructions that, when executed by the at least one processor, further cause the computing device to dynamically modify the rendering of the pixels corresponding to the touch input within the graphical user interface to move at the rendering velocity less than the velocity of the touch input by scaling the rendering velocity to a proportion of the velocity of touch input.

13. The non-transitory computer-readable medium of claim 9, further comprising instructions that, when executed by the at least one processor, further cause the computing device to:
- detect that the velocity of the touch input decreases below a minimum threshold; and
- in response to detecting that the velocity of the touch input decreases below the minimum threshold, maintain the rendering velocity above a minimum velocity of movement.

14. The non-transitory computer-readable medium of claim 9, wherein the rendering velocity comprises a velocity of movement of a selectable user interface element.

15. The non-transitory computer-readable medium of claim 9, wherein rendering the pixels corresponding to the touch input within the graphical user interface comprises rendering movement of the pixels across the graphical user interface.

16. A method comprising:
monitoring, via a touch device, a velocity of a touch input within a graphical user interface;
rendering pixels corresponding to the touch input within the graphical user interface based on the velocity of the touch input;
determining that the velocity of the touch input is below a predetermined threshold; and
dynamically modifying, in response to determining that the velocity of the touch input is below the predetermined threshold and based on the velocity of the touch input, rendering of the pixels corresponding to the touch input within the graphical user interface to move at a rendering velocity less than the velocity of the touch input by:
generating a rendering gap between a location of the touch input on the touch device and a location of the pixels within the graphical user interface; and
dynamically updating the rendering gap according to changes in the velocity of the touch input.

17. The method of claim 16, further comprising:
detecting that the velocity of the touch input has returned above the predetermined threshold; and
in response to detecting that the velocity of the touch input has returned above the predetermined threshold, incrementally returning the rendering of the pixels corresponding to the touch input within the graphical user interface to a default state.

18. The method of claim 17, further comprising incrementally returning the rendering of the pixels corresponding to the touch input within the graphical user interface to the default state by:
incrementally increasing the rendering velocity until reaching the velocity of the touch input; and
reducing the rendering gap with the increasing of the rendering velocity until the location of the touch input on the touch device and the location of the pixels within the graphical user interface realign.

19. The method of claim 16, further comprising:
dynamically modifying the rendering of the pixels corresponding to the touch input within the graphical user interface to move at the rendering velocity less than the velocity of the touch input by scaling the rendering velocity to a proportion of the velocity of the touch input;
detecting that the velocity of the touch input decreases below a minimum threshold; and
in response to detecting that the velocity of the touch input decreases below the minimum threshold, maintaining the rendering velocity above a minimum velocity of movement.

20. The method of claim 16, wherein the rendering velocity comprises a velocity of movement of a selectable user interface element.

\* \* \* \* \*